United States Patent
Yoshimura et al.

(10) Patent No.: US 11,128,408 B2
(45) Date of Patent: Sep. 21, 2021

(54) TERMINAL APPARATUS, BASE STATION APPARATUS, AND COMMUNICATION METHOD

(71) Applicants: Sharp Kabushiki Kaisha, Sakai (JP); FG Innovation Company Limited, New Territories (HK)

(72) Inventors: Tomoki Yoshimura, Sakai (JP); Shouichi Suzuki, Sakai (JP); Wataru Ohuchi, Sakai (JP); Liqing Liu, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 26 days.

(21) Appl. No.: 16/619,522

(22) PCT Filed: May 23, 2018

(86) PCT No.: PCT/JP2018/019799
§ 371 (c)(1),
(2) Date: Dec. 5, 2019

(87) PCT Pub. No.: WO2018/230289
PCT Pub. Date: Dec. 20, 2018

(65) Prior Publication Data
US 2020/0145142 A1    May 7, 2020

(30) Foreign Application Priority Data

Jun. 13, 2017   (JP) .............................. JP2017-115880

(51) Int. Cl.
*H04L 1/18* (2006.01)
*H04L 1/00* (2006.01)
*H04W 72/04* (2009.01)

(52) U.S. Cl.
CPC .......... *H04L 1/1819* (2013.01); *H04L 1/0061* (2013.01); *H04L 1/0071* (2013.01); *H04L 1/1896* (2013.01); *H04W 72/042* (2013.01)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS

2015/0156770 A1*  6/2015  Beluri ............... H04W 72/0413
                                                      370/329
2018/0287745 A1*  10/2018  Sun ..................... H03M 13/1111
2018/0287752 A1*  10/2018  Park ...................... H04L 5/0053

OTHER PUBLICATIONS

3GPP TSG RAN WG1#89, Hangzhou, China, May 15-19, 2017, R1-1708505, Agenda item: 7.1.3.1.4, Source: Nokia, Alcatel-Lucent Shanghai Bell, Title: On DCI contents and the configurability of DCI fields in NR. (Year: 2017).*

(Continued)

*Primary Examiner* — Peter G Solinsky
*Assistant Examiner* — Sanjay K Dewan
(74) *Attorney, Agent, or Firm* — ScienBiziP, P.C.

(57) ABSTRACT

A terminal apparatus capable of efficiently performing uplink and/or downlink communication is provided. With respect to communication related to transport blocks and code block groups, in a case that a PDSCH and/or a PUSCH is scheduled by a PDCCH detected in a common search space CSS, an operation applied to a transmission process includes a prescribed operation regardless of a prescribed condition and first configuration information. In a case that the PDSCH and/or the PUSCH is scheduled by the PDCCH detected in a UE-specific search space USS, the operation applied to the transmission process is provided, based at least on the prescribed condition and/or the first configuration information.

4 Claims, 16 Drawing Sheets

CBG is constructed with interleaving the first sequence $b_k$

(58) Field of Classification Search
USPC .......................................................... 370/329
See application file for complete search history.

(56) References Cited

OTHER PUBLICATIONS

3GPP TSG RAN WG1 Meeting#89, Hangzhou, P.R. China, May 15-19, 2017, R1-1709262, Agenda item: 7.1.3.3.5, WF on CBG-based (re)transmission, NTT DOCOMO, Panasonic, OPPO, [ZTE], CATT, Ericsson. (Year: 2017).*
3GPP TSG RAN WG1 Meeting #88bis, Spokane, USA, Apr. 3-7, 2017, R1-1705401, Agenda item: 8.1.3.3.2, Source: Samsung, Title: Overview of CBG-based retransmission in NR. (Year: 2017).*
3GPP TSG RAN WG1 Meeting #88bis, Spokane, USA, Apr. 3-7, 2017, R1-17xxxxx, WF on HARQ operation, LG Electronics, CATT. (Year: 2017).*
LG Electronics:"Discussion on configurability of DCI contents", 3GPP Draft; R1-1707633 Discussion on Configurability of DCI Contents,3rd Generation Partnership Project(3GPP), Mobile Competence Centre; 650, Route Des Lucioles; F-06921 Sophia-Antipolis Cedex; F,vol. RAN WG1,No. Hangzhou; May 15, 2017-May 19, 2017, May 6, 2017(May 6, 2017), XP051261973, Retrieved from the Internet: URL:http://www.3gpp.org/ftp/tsg_ran/WG1_RL1/TSGR1_89/Docs/,[retrieved on May 6, 2017],*the whole document*.
NTT Docomo et al:"CBG based (re)transmission,preemption indication and subsequent trasnmission in NR", 3GPP Draft;R1-1708484, 3rd Generation Partnership Project(3GPP),Mobile Competence Centre;650, Route Des Lucioles; F-06921 Sophia-Antipolis Cedex; France, vol. RAN WG1, No. Hangzhou; May 15, 2017-May 19, 2017, May 14, 2017(May 14, 2017), XP051273676, Retrieved from the Internet: URL:http://www.3gpp.org/ftp/Meetings_3GPP_SYNC/RAN1/Docs/,[retrieved on May 14, 2017],* the whole document*.
Official Communication issued in International Patent Application No. PCT/JP2018/019799, dated Aug. 14, 2018.
"3rd Generation Partnership Project; Technical Specification Group Radio Access Network; Study on New Radio (NR) Access Technology Physical Layer Aspects (Release 15)", 3GPP TR 38.802 V0.0.3, Mar. 2016, pp. 1-19.
NTT DOCOMO, "New SID Proposal: Study on New Radio Access Technology", 3GPP TSG RAN Meeting #71, RP-160671, Mar. 7-10, 2016, 8 pages.
LG Electronics et al., "WF on HARQ operation", 3GPP TSG RAN WG1 Meeting #88bis, R1-17XXXXX, Apr. 3-7, 2017, 3 pages.
Samsung, "Overview of CBG-based retransmission in NR", 3GPP TSG RAN WG1 Meeting #88bis, R1-1705401, Apr. 3-7, 2017, pp. 1-4.
NTT DOCOMO et al., "WF on CBG-based (re)transmission", 3GPP TSG RAN WG1 Meeting #89, R1-1709262, May 15-19, 2017, 3 pages.
Nokia et al., "On DCI contents and the configurability of DCI fields in NR", 3GPP TSG RAN WG1#89, R1-1708505, May 15-19, 2017, 4 pages.

* cited by examiner

CBG is constructed without interleaving the first sequence $b_k$

CBG is constructed with interleaving the first sequence $b_k$ if $B \leq Z$ $L = 0$ Number of code blocks: $N_{CB} = 1$ $B' = B$ else $L = 24$ Number of code blocks: $N_{CB} = ceil(B/(Z-L))$.

$B' = B + N_{CB} \cdot L$ end if

B: Length of the second sequence $b_k$
Z: Maximum code block size
$N_{CB}$: Number of code blocks
B': Length of the sequence $b_k$ including Third CRC bits
L: Length of the Third CRC bits

FIG. 10

$$\text{Set } k_0 = R_{subblock}^{TC} \cdot \left( 2 \cdot \left\lceil \frac{N_{cb}}{8R_{subblock}^{TC}} \right\rceil \cdot rv_{idx} + 2 \right),$$

Set $k = 0$ and $j = 0$ while $\{k < E\}$ if $w_{(k_0+j) \bmod N_{cb}} \neq <NULL>$ $e_k = w_{(k_0+j) \bmod N_{cb}}$ $k = k+1$ end if $j = j+1$ end while

FIG. 14

TERMINAL APPARATUS, BASE STATION APPARATUS, AND COMMUNICATION METHOD

TECHNICAL FIELD

An aspect of the present invention relates to a terminal apparatus, a base station apparatus, and a communication method.

BACKGROUND ART

A radio access method and a radio network for cellular mobile communications (hereinafter, referred to as "Long Term Evolution (LTE)", or "Evolved Universal Terrestrial Radio Access (EUTRA)") have been studied in the 3rd Generation Partnership Project (3GPP). In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by a base station apparatus. A single base station apparatus may manage multiple cells.

The 3GPP is making efforts to formulate a next-generation standard (New Radio (NR)) that is to be proposed for International Mobile Telecommunication (IMT)-2020, which is a standard for a next-generation mobile communication system developed by the International Telecommunication Union (ITU) (NPL 1). NR requires satisfaction of requirements based on three scenarios assumed in a single technology framework and referred to as enhanced Mobile BroadBand (eMBB), massive Machine Type Communication (mMTC), and Ultra Reliable and Low Latency Communication (URLLC).

In order to satisfy the requirements, error correction codes to be employed for NR are in study (NPL 2).

CITATION LIST

Non Patent Literature

NPL 1: "New SID proposal: Study on New Radio Access Technology", RP-160671, NTT docomo, 3GPP TSG RAN Meeting #71, Goteborg, Sweden, 7-10 Mar. 2016.

NPL 2: "3GPP TR 38.802 V0.0.3 (2016 March)", R1-165889, 9 Jun. 2016.

SUMMARY OF INVENTION

Technical Problem

An object of the present invention is to provide a terminal apparatus capable of efficiently performing uplink and/or downlink communication, a communication method used for the terminal apparatus, an integrated circuit mounted in the terminal apparatus, a base station apparatus capable of efficiently performing uplink and/or downlink communication, a communication method used for the base station apparatus, and an integrated circuit mounted in the base station apparatus.

Solution to Problem (1) According to some aspects of the present invention, the following measures are provided. Specifically, a first aspect of the present invention is a terminal apparatus including a receiver configured to receive a transport block in a PDSCH scheduled by using downlink control information, and a decoding unit configured to decode a first code block group included in the transport block, wherein the first code block group includes one or more code blocks, and a sequence included in the one or more code blocks is provided, based at least on a redundancy version, and in a case that the downlink control information indicates flushing of a first soft bit corresponding to the first code block group, the redundancy version of the one or more code blocks is configured to a prescribed value, and in a case that the downlink control information does not indicate flushing of the first soft bit, the redundancy version of the one or more code blocks is indicated by the downlink control information.

(2) A second aspect of the present invention is a base station apparatus including a transmitter configured to schedule a PDSCH for a transport block by using downlink control information, and a coding unit configured to configure and code a first code block group included in the transport block, wherein the first code block group includes one or more code blocks, and a sequence included in the one or more code blocks is provided, based at least on a redundancy version, and in a case that the downlink control information indicates flushing of a first soft bit corresponding to the first code block group, the redundancy version of the one or more code blocks is configured to a prescribed value, and in a case that the downlink control information does not indicate flushing of the first soft bit, the redundancy version of the one or more code blocks is indicated by the downlink control information.

(3) A third aspect of the present invention is a communication method for a base station apparatus, the method including the steps of scheduling a PDSCH for a transport block by using downlink control information, and configuring and coding a first code block group included in the transport block, wherein the first code block group includes one or more code blocks, and a sequence included in the one or more code blocks is provided, based at least on a redundancy version, and in a case that the downlink control information indicates flushing of a first soft bit corresponding to the first code block group, the redundancy version of the one or more code blocks is configured to a prescribed value, and in a case that the downlink control information does not indicate flushing of the first soft bit, the redundancy version of the one or more code blocks is indicated by the downlink control information.

Advantageous Effects of Invention

According to the present invention, the terminal apparatus can efficiently perform uplink and/or downlink communication. The base station apparatus can efficiently perform uplink and/or downlink communication.

BRIEF DESCRIPTION OF DRAWINGS

FIG. 10 is a diagram illustrating an example of a first procedure for calculating the number of code blocks in a code block segmentation unit 4011 according to an aspect of the present embodiment.

FIG. 14 is a diagram illustrating an example of a rate matching operation of a bit selection and pruning unit 4005 according to an aspect of the present embodiment.

DESCRIPTION OF EMBODIMENTS

Embodiments of the present invention will be described below. The description "given by" included in the following description may be construed as "determined" or "configured."

Figure 1:
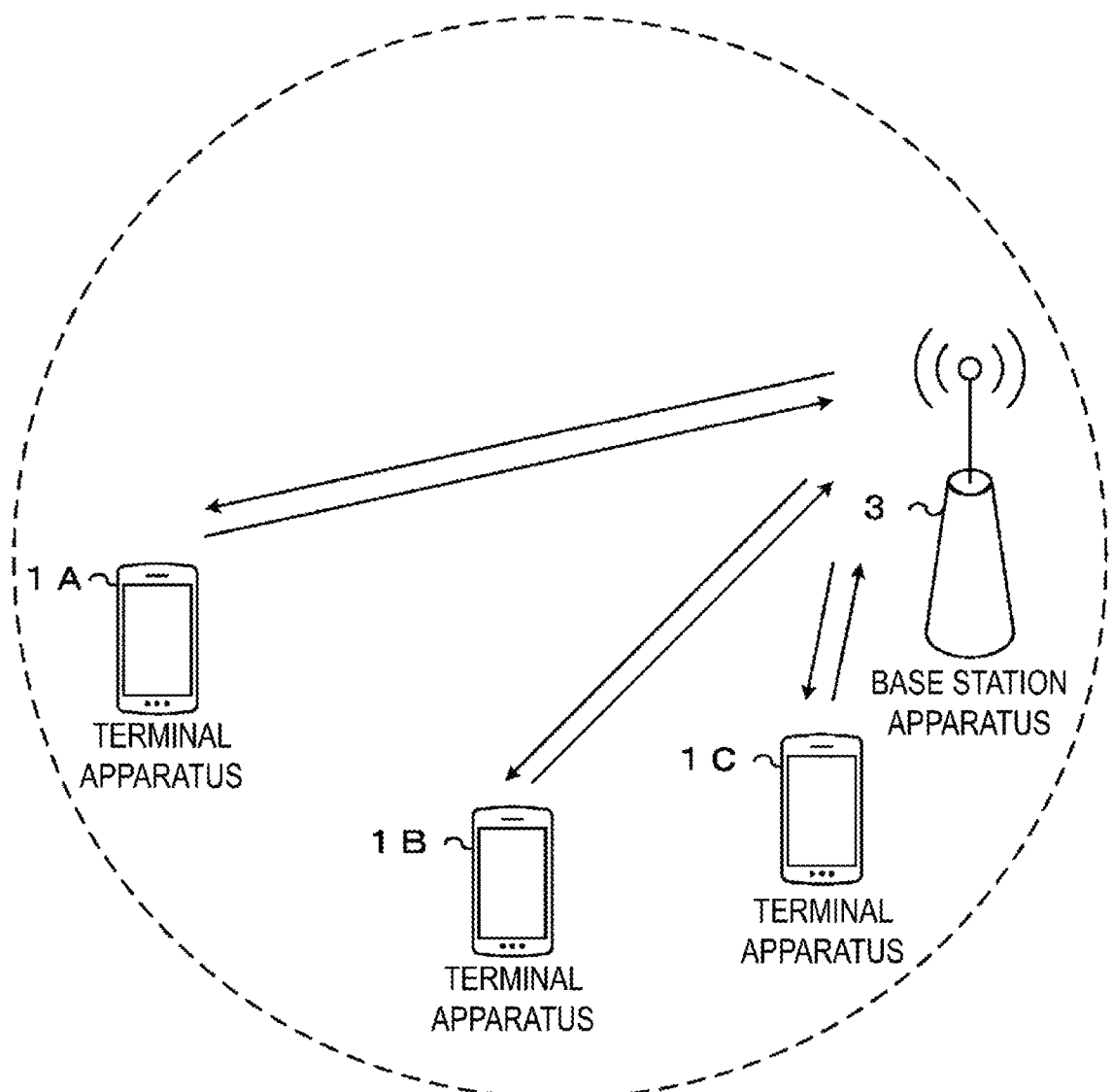
FIG. 1 is a conceptual diagram of a radio communication system according to the present embodiment.

FIG. 1 is a conceptual diagram of a radio communication system according to the present embodiment. In FIG. 1, the radio communication system includes terminal apparatuses 1A to 1C and a base station apparatus 3. Hereinafter, the terminal apparatuses 1A to 1C are also referred to as a terminal apparatus 1.

An example of a configuration of a radio frame according to the present embodiment will be described below.

Figure 2:
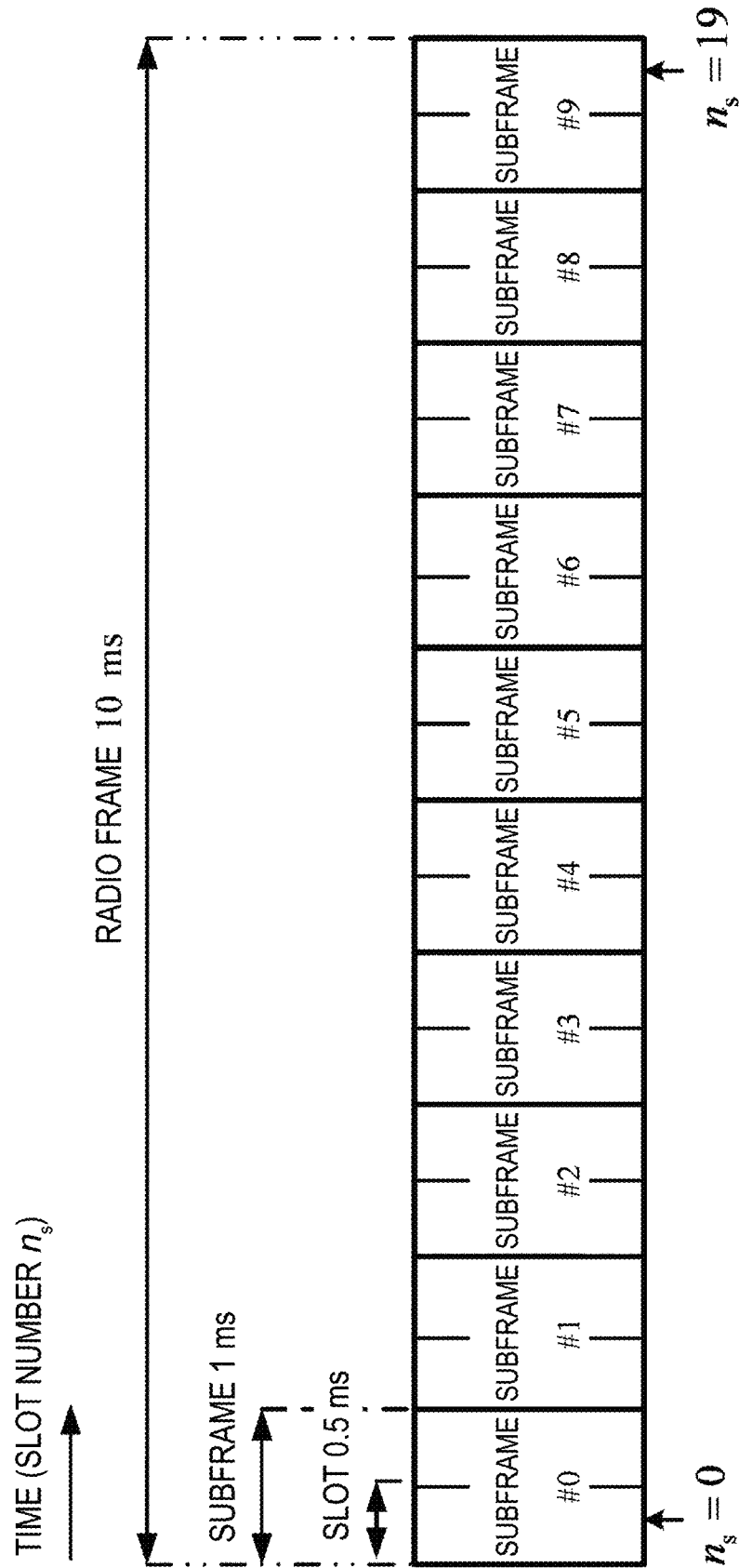
FIG. 2 is an example illustrating a configuration of a radio frame, subframes, and slots according to an aspect of the present embodiment.

FIG. 2 is an example illustrating a configuration of a radio frame, subframes, and slots according to an aspect of the present embodiment. In an example illustrated in FIG. 2, the slot is 0.5 ms in length, the subframe is 1 ms in length, and the radio frame is 10 ms in length. The slot may be a unit of resource allocation in a time domain. The slot may be a unit to which one transport block is mapped. The transport block may be mapped to one slot. The transport block may be a unit of data transmitted within a prescribed interval (e.g., Transmission Time Interval (TTI)) defined by a higher layer (e.g., Medium Access Control (MAC)).

The length of the slot may be given by the number of OFDM symbols. For example, the number of OFDM symbols may be 7 or 14. The length of the slot may be given, based at least on the length of the OFDM symbol. The length of the OFDM symbol may be given, based at least on a second subcarrier spacing. The length of the OFDM symbol may be given, based at least on the number of points in the Fast Fourier Transform (FFT) used to generate the OFDM symbol. The length of the OFDM symbol may include a length of a Cyclic Prefix (CP) added to the OFDM symbol. Here, the OFDM symbol may be referred to as a symbol. In a case that a communication scheme other than OFDM is used in communication between the terminal apparatus 1 and the base station apparatus 3 (for example, in a case that SC-FDMA or DFT-s-OFDM is used), an SC-FDMA symbol and/or a DFT-s-OFDM symbol to be generated is also referred to as an "OFDM symbol". In other words, the OFDM symbol may include a DFT-s-OFDM symbol and/or an SC-FDMA symbol. For example, the length of the slot may be 0.25 ms, 0.5 ms, 1 ms, 2 ms, or 3 ms. The OFDM may include SC-FDMA or DFT-s-OFDM.

OFDM includes a multi-carrier communication scheme to which wave shaping (Pulse Shape), PAPR reduction, out-of-band radiation reduction, filtering, and/or phase processing (e.g., phase rotation) is applied. The multi-carrier communication scheme may be a communication scheme that generates and/or transmits signals multiplexed with multiple subcarriers.

The subframe may be 1 ms in length. The length of the subframe may be given, based on a first subcarrier spacing. For example, in a case that the first subcarrier spacing is 15 kHz, the length of the subframe may be 1 ms. The subframe may include one or more slots. For example, the subframe may include two slots.

The radio frame may include multiple subframes. The number of subframes for the radio frame may be, for example, 10. The radio frame may include multiple slots. The number of slots for the radio frame may be, for example, 10.

Physical channels and physical signals according to various aspects of the present embodiment will be described below. The terminal apparatus may transmit physical channels and/or physical signals. The base station apparatus may transmit physical channels and/or physical signals.

Downlink physical channels and downlink physical signals are collectively referred to as a downlink signal. Uplink physical channels and uplink physical signals are collectively referred to as an uplink signal. The downlink physical channels and the uplink physical channels are collectively referred to as a physical channel. The downlink physical signals and the uplink physical signals are collectively referred to as a physical signal.

In uplink radio communication from the terminal apparatus 1 to the base station apparatus 3, at least the following uplink physical channels may be used. The uplink physical channels may be used by the physical layer for transmission of information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The uplink control information includes: Channel State Information (CSI) for downlink channel, a Scheduling Request (SR) to be used to request a PUSCH (Uplink-Shared Channel (UL-SCH)) resource for an initial transmission, and a Hybrid Automatic Repeat request ACKnowledgement (HARQ-ACK) for downlink data (a Transport block (TB), a Medium Access Control Protocol Data Unit (MAC PDU), a Downlink-Shared Channel (DL- SCH), or a Physical Downlink Shared Channel (PDSCH)). The HARQ-ACK indicates an acknowledgement (ACK) or a negative-acknowledgement (NACK). The HARQ-ACK is also referred to as HARQ feedback, HARQ control information, and ACK/NACK. The HARQ-ACK may include an HARQ-ACK for a Code Block Group (CBG). The HARQ-ACK for a part or all of the CBG included in the transport block may be transmitted on the PUCCH or PUSCH.

The Channel State Information (CSI) may include a Channel Quality Indicator (CQI) and a Rank Indicator (RI). The channel quality indicator may include a Precoder Matrix Indicator (PMI). The channel state information may include the precoder matrix indicator. The CQI is an indicator associated with channel quality (propagation strength), and PMI is an indicator that indicates a precoder. The RI is an indicator that indicates the transmission rank (or the number of transmission layers).

The PUSCH is used for transmission of uplink data (TB, MAC PDU, UL-SCH, or PUSCH). The PUSCH may be used to transmit the HARQ-ACK and/or channel state information along with the uplink data. The PUSCH may be used to transmit only the channel state information or to transmit only the HARQ-ACK and the channel state information. The PUSCH is used to transmit random access message 3.

The PRACH is used to transmit a random access preamble (random access message 1). The PRACH may be used for indicating at least some of an initial connection establishment procedure, a handover procedure, a connection re-establishment procedure, synchronization (timing adjustment) for transmission of uplink data, and a request for a PUSCH (UL-SCH) resource. The random access preamble may be used to notify the base station apparatus 3 of an index (random access preamble index) given by the higher layer of the terminal apparatus 1.

The random access preamble may be given by cyclic shifting a Zadoff-Chu sequence corresponding to a physical root sequence index u. The Zadoff-Chu sequence may be generated based on a physical root sequence index u. In one cell, multiple random access preambles may be defined. The random access preamble may be identified based at least on the index of the random access preamble. Different random access preambles corresponding to different indexes of the random access preamble may correspond to different combinations of the physical root sequence index u and a cyclic shift. The physical root sequence index u and the cyclic shift may be provided, based at least on the information included in the system information. The physical root sequence index u may be an index identifying a sequence included in the random access preamble. The random access preamble may be identified, based at least on the physical root sequence index u.

In uplink radio communication from the terminal apparatus 1 to the base station apparatus 3, the following uplink physical signals may be used. The uplink physical signal need not be used for transmitting information output from the higher layer, but is used by the physical layer.

Uplink Reference Signal (UL RS)

According to the present embodiment, at least the following two types of uplink reference signals may be used.

Demodulation Reference Signal (DMRS)
Sounding Reference Signal (SRS)

The DMRS is associated with transmission of the PUSCH and/or the PUCCH. The DMRS may be multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. The DMRS may correspond to the PUSCH. Transmission of both of the PUCCH and the DMRS is hereinafter referred to simply as transmission of the PUCCH. The DMRS may correspond to the PUCCH.

The SRS need not be associated with the transmission of the PUSCH and/or the PUCCH. The SRS may be associated with the transmission of the PUSCH and/or the PUCCH. The base station apparatus 3 may use the SRS for measuring the channel state. The SRS may be transmitted at the end of the subframe in the uplink slot or in a prescribed number of OFDM symbols from the end of the subframe.

The following downlink physical channels may be used for downlink radio communication from the base station apparatus 3 to the terminal apparatus 1. The downlink physical channels may be are used by the physical layer for transmission of information output from the higher layer.

Physical Broadcast Channel (PBCH)
Physical Downlink Control Channel (PDCCH)
Physical Downlink Shared Channel (PDSCH)

The PBCH is used for broadcasting a Master Information Block (MIB, a Broadcast Channel (BCH)) that is shared by the terminal apparatuses 1. The PBCH may be transmitted based on prescribed transmission intervals. For example, the PBCH may be transmitted at intervals of 80 ms. At least a part of the information included in the PBCH may be updated at intervals of 80 ms. The PBCH may include 288 subcarriers. The PBCH may include 2, 3, or 4 OFDM symbols. The MIB may include information associated with an identifier (index) of a synchronization signal. The MIB may include information indicating at least some of a slot number, a subframe number, and a radio frame number in which the PBCH is transmitted. First configuration information may be included in the MIB. The first configuration information may be configuration information used at least in some or all of random access message 2, random access message 3, and random access message 4.

The PDCCH is used to transmit Downlink Control Information (DCI). The downlink control information is also referred to as DCI format. The downlink control information may include at least one of a downlink grant or an uplink grant. The downlink grant is also referred to as a downlink assignment or a downlink allocation. The uplink grant and the downlink grant are also collectively referred to as a grant.

One downlink grant is at least used for scheduling one PDSCH within one serving cell. The downlink grant may be used at least for scheduling the PDSCH within the same slot as that in which the downlink grant is transmitted.

One uplink grant may be used at least for scheduling one PUSCH within one serving cell.

The downlink control information may include information indicating which CBG is actually transmitted. Information indicating which CBG is actually transmitted is also referred to as information indicating CBG transmission. The information indicating CBG transmission may indicate PDSCH scheduled by the downlink control information and/or the CBG included in PUSCH and actually transmitted. The information indicating the CBG transmission may be a bitmap given based at least on the PDSCH scheduled by the downlink control information including information indicating CBG transmission, and/or number $N_{CBG}$ of CBGs included in transport block included in the PUSCH, and/or the maximum number $N_{CBG\_max}$ of CBGs included in the transport block. Each of the bits included in the bitmap may correspond to one CBG. The bit may be set to '1' to indicate that the corresponding CBG is to be transmitted. The bit may be set to '0' to indicate that the corresponding CBG is not to be transmitted. Note that in a case that information indicating CBG transmission is included in the downlink grant, the information may indicate the CBG included in the PDSCH and that is actually to be transmitted. In a case that information indicating CBG transmission is included in the uplink grant, the information may indicate a CBG included in PUSCH and that is to be retransmitted.

The downlink control information may be transmitted with information indicating a method for processing soft bits. The method for processing soft bits may include processing of flushing soft bits. "Flushing soft bits" may be "deleting, from a prescribed storage capacity, soft bits stored (saved) in the prescribed storage capacity". The prescribed storage capacity may be, for example, a memory, a buffer, a disk, or the like. The information indicating the method for processing soft bits may be a bitmap provided based at least on the number $N_{CBG}$ of CBGs included in the transport block and/or the maximum number $N_{CBG\_max}$ of CBGs included in the transport block. The information indicating the method for processing soft bits may be information indicating whether a stored soft bit corresponding to a CBG is to be flushed. The stored soft bit corresponding to the CBG may be the stored soft bit corresponding to CBs included in the CBG. Each of the bits included in the bitmap may correspond to one CBG. In order to indicate to the terminal apparatus 1 that a soft bit corresponding to a CBG is to be flushed, the bit may be set to '1'. In order to indicate to the terminal apparatus 1 that the soft bit corresponding to the CBG is not to be flushed, the bit may be set to '0'.

"Whether the stored soft bit corresponding to the CBG is flushed or not" may be "whether the soft bit corresponding to the CBG is used for decoding or not". For example, for decoding of the CBG, whether the soft bit corresponding to the CBG is used or not may be provided, based at least on the information indicating the method for processing soft bits. The soft bit corresponding to the CBG may be a soft bit corresponding to the CBG and stored in a soft buffer. The CBG may be the last transmitted CBG. For example, the bit may be set to '1' to indicate to the terminal apparatus 1 that the soft bit corresponding to the CBG is not used for decoding. The bit may be set to '0' to indicate to the terminal apparatus 1 that the soft bit corresponding to the CBG is used for decoding.

"Whether the stored soft bit corresponding to the CBG is to be flushed or not" may be "whether received data of the CBG is combined with the soft bit corresponding to the CBG or not". In decoding of the CBG, whether the received data of the CBG is combined with the soft bit or not may be provided, based at least on the information indicating the method for processing soft bits. For example, the bit may be set to '1' to indicate to the terminal apparatus 1 that the received data of the CBG is not combined with the stored soft bit. The bit may be set to '0' to indicate to the terminal apparatus 1 that the received data of the CBG is combined with the stored soft bit.

In a case of failing to decode the code block included in the transport block, the terminal apparatus 1 may store some or all of the soft bits of the code block. The terminal apparatus 1 may flush the soft bits of the code block, based on information indicating the method for processing soft bits. For example, in a case that terminal apparatus 1 is indicated to flush the soft bit corresponding to the CBG by using the information indicating the method for processing soft bits, the terminal apparatus 1 may flush the soft bits of the code block included in the CBG.

Whether a stored soft bit corresponding to a transport block is to be flushed may be provided, based at least on whether the value of a new data indicator included in the downlink control information used to schedule the PDSCH and/or PUSCH for a transport block corresponding to a prescribed HARQ process has changed from a new data indicator for the last transport block corresponding to the prescribed HARQ process. For example, the terminal apparatus 1 may receive the downlink control information used to schedule the PDSCH and/or PUSCH for the transport block corresponding to the prescribed HARQ process, and in a case that the value of the new data indicator included in the downlink has changed from the new data indicator for the last transport block corresponding to the prescribed HARQ process, flush the soft bit for the last transport block.

"Whether the stored soft bit corresponding to the transport block is to be flushed or not" may be "whether the soft bit corresponding to the transport block is used for decoding or not". "Whether the stored soft bits corresponding to the transport block is to be flushed or not" may be "whether the received data of the transport block is combined with the soft bit corresponding to the transport block or not".

The downlink control information used to schedule the PDSCH and/or PUSCH for the initial transmission of the transport block need not include the information indicating CBG transmission and/or the information indicating the method for processing soft bits. The downlink control information used to schedule the PDSCH and/or PUSCH for the initial transmission of the transport block may include the information indicating CBG transmission and/or the information indicating the method for processing soft bits. The information indicating CBG transmission and included in the downlink control information used to schedule the PDSCH and/or PUSCH for the initial transmission of the transport block and/or the information indicating the method for processing soft bits may be set equal to a predefined bit sequence (e.g., an all-0 sequence or all-1 sequence). In the downlink control information used to schedule the PDSCH and/or PUSCH for the initial transmission of the transport block, a region (a bit field, information bits, a bit region, or the number of bits) used for the information indicating CBG transmission and/or the information indicating the method for processing soft bits may be reserved in advance. The region (bit field, information bits, bit region, or the number of bits) for the following information may be used at least for configuration of an MCS and/or a TBS: the information indicating CBG transmission and included in the downlink control information used to schedule the PDSCH and/or PUSCH for the initial transmission of the transport block and/or the information indicating the method for processing soft bits.

Whether the PDSCH and/or PUSCH for the transport block is for the initial transmission or not may be provided, based at least on the new data indicator included in the downlink control information used to schedule the PDSCH and/or PUSCH for the transport block. For example, whether the PDSCH and/or PUSCH for the transport block corresponding to the prescribed HARQ process number is the initial transmission or not may be provided based on whether or not the new data indicator included in the downlink control information for scheduling the PDSCH and/or PUSCH for the transport block that corresponds to the prescribed HARQ process number and is changed from the new data indicator corresponding to the last transmitted transport block.

Downlink control information used to schedule retransmission of the PDSCH and/or PUSCH for the transport block may include the information indicating CBG transmission and/or information indicating the method for processing soft bits.

The downlink control information may include a New Data Indicator (NDI). The new data indicator may be used at least to indicate whether the transport block corresponding to the new data indicator is for the initial transmission. The new data indicator may be information indicating whether or not the last transmitted transport block corresponding to a prescribed HARQ process number is identical to a transport block corresponding to the HARQ process number and included in the PDSCH and/or PUSCH scheduled by using the downlink control information including the new data indicator. The HARQ process number is the number used to identify the HARQ process. The HARQ process number may be included in the downlink control information. The HARQ process is a process for managing the HARQ. The new data indicator may indicate whether or not transmission of the transport block corresponding to the prescribed HARQ process number and included in the PDSCH and/or PUSCH scheduled by using the downlink control information including the new data indicator is retransmission of the last transmitted transport block corresponding to the prescribed HARQ process number and included in the PDSCH and/or PUSCH. Whether or not the transmission of the transport block included in the PDSCH and/or PUSCH scheduled by using the downlink control information is retransmission of the last transmitted transport block may be provided, based on whether or not the new data indicator has changed from (or toggled compared to) a new data indicator corresponding to the last transmitted transport block.

In the terminal apparatus 1, one or more control resource sets are configured for searching for the PDCCH. The terminal apparatus 1 attempts to receive the PDCCH in the configured control resource set.

The control resource set will be described below.

Figure 3:
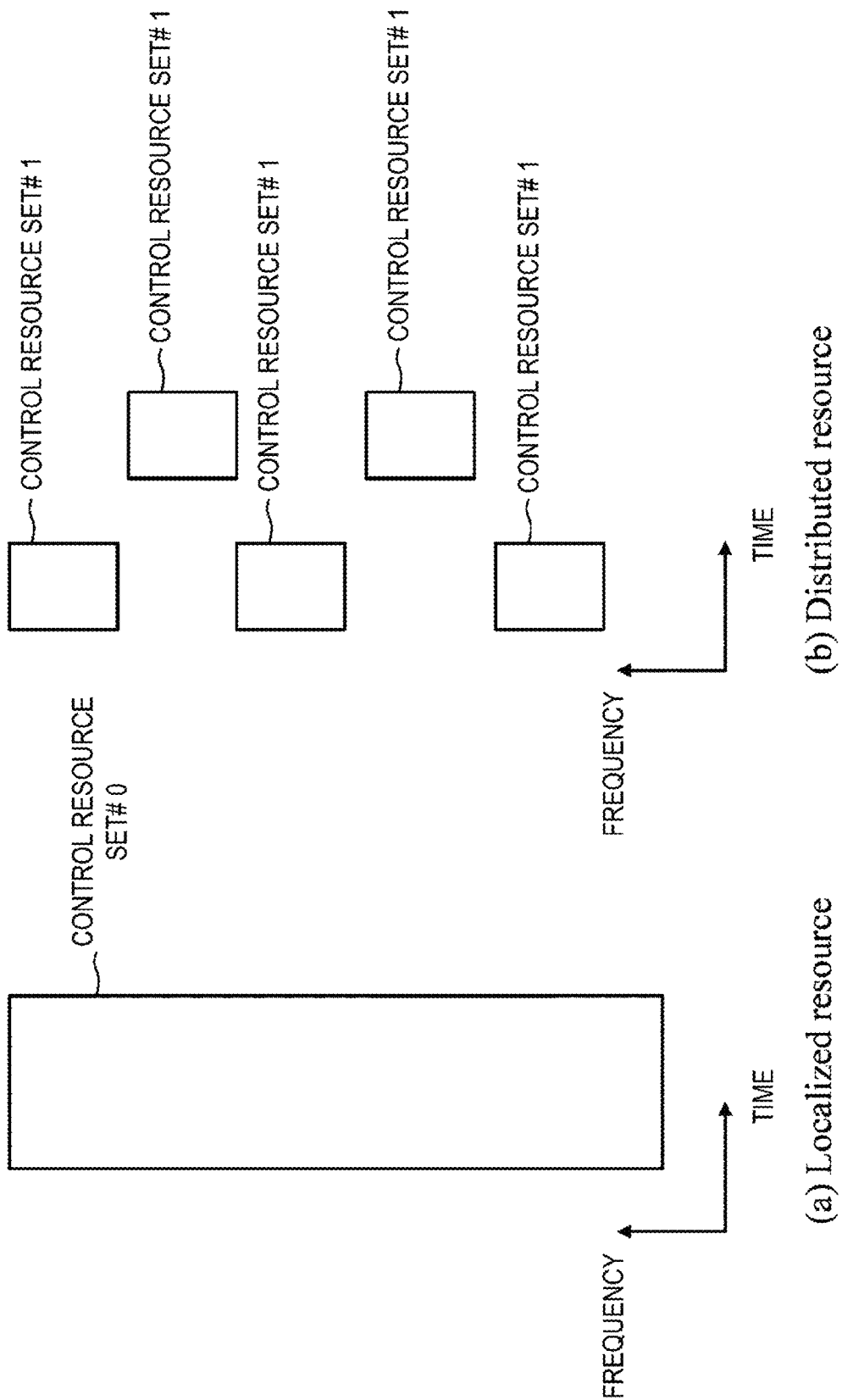
FIG. 3 is a diagram illustrating an example of mapping of control resource sets according to an aspect of the present embodiment.

FIG. 3 is a diagram illustrating an example of mapping of the control resource sets according to an aspect of the present embodiment. The control resource set may indicate a time and frequency domain in which one or more control channels may be mapped. The control resource set may be a region in which the terminal apparatus 1 attempts to receive the PDCCH. As illustrated in FIG. 3(*a*), the control resource set may be constituted by using continuous resources (Localized resources). As illustrated in FIG. 3(*b*), the control resource set may be constituted by using non-continuous resources (distributed resources).

In the frequency domain, mapping of the control resource set may be in units of resource blocks. In the time domain, mapping of the control resource set may be in units of OFDM symbols.

The frequency domain of the control resource set may be the same as the system bandwidth of the serving cell. The frequency domain of the control resource set may also be provided, based at least on the system bandwidth of the serving cell. The frequency domain of the control resource set may be provided based at least on the higher layer signaling and/or the downlink control information. The frequency domain of the control resource set may be provided, based at least on the synchronization signal or the bandwidth of the PBCH. The frequency domain of the control resource set may be the same as the synchronization signal or the bandwidth of the PBCH.

The time domain of the control resource set may be provided, based at least on the higher layer signaling and/or the downlink control information.

The control resource set may include at least one or both of a Common control resource set and a Dedicated control resource set. The common control resource set may be a control resource set configured in common for multiple terminal apparatuses 1. The common control resource set may be provided, based at least on the MIB, first system information, second system information, common RRC signaling, a cell ID, and the like. The dedicated control resource set may be a control resource set configured to be dedicated to the terminal apparatus 1. The dedicated control resource set may be provided, based at least on the dedicated RRC signaling and/or a value of C-RNTI.

The control resource set may be a set of control channels (or control channel candidates) to be monitored by the terminal apparatus 1. The control resource set may include a set of control channels (or control channel candidates) to be monitored by the terminal apparatus 1. The control resource set may include one or more search spaces (Search Spaces (SSs)). The control resource set may be a search space.

The search space includes one or more PDCCH candidates. The terminal apparatus 1 receives the PDCCH candidates included in the search space and attempts to receive the PDCCH. Here, the PDCCH candidates are also referred to as the blind detection candidates.

The search space may include at least one or both of a Common Search Space (CSS, common search space) and a UE-specific Search Space (USS). The CSS may be a search space configured in common for multiple terminal apparatuses 1. The USS may be a search space including a configuration dedicated to the terminal apparatus 1. The CSS may be provided, based at least on the MIB, the first system information, the second system information, the common RRC signaling, the cell ID, and the like. The USS may be provided, based at least on the dedicated RRC signaling and/or the value of C-RNTI.

The common control resource set may include at least one or both of the CSS and the USS. The dedicated control resource set may include at least one or both of the CSS and the USS. The dedicated control resource set need not include the CSS. In a case that PDSCH and/or PUSCH is scheduled by the PDCCH detected in the CSS, an operation applied to a transmission process 3000 may be operation 2 regardless of a prescribed condition 11 and the first configuration information. In a case that PDSCH and/or PUSCH is scheduled by the PDCCH detected in the USS, the operation applied to the transmission process 3000 may be provided, based at least on the prescribed condition 11 and/or the first configuration information.

The physical resource for the search space includes a constituent unit (Control Channel Element (CCE)) of the control channel. The CCE includes a prescribed number of Resource Element Groups (REGs). For example, the CCE may include six REGs. The REG may include one OFDM symbol in one Physical Resource Block (PRB). In other words, the REG may include 12 Resource Elements (REs). The PRB is also simply referred to as a Resource Block (RB).

The PDSCH is used to transmit downlink data (TB, MAC PDU, DL-SCH, and PDSCH). The PDSCH is used at least to transmit a random access message 2 (random access response). The PDSCH is used at least to transmit system information including parameters used for initial access.

In downlink radio communication, the downlink physical signals below may be used. The downlink physical signals need not be used for transmission of information output from the higher layer, but may be used by the physical layer.

Synchronization signal (SS)

Downlink Reference Signal (DL RS)

The synchronization signal is used for the terminal apparatus 1 to establish synchronization in a frequency domain and a time domain in the downlink. The synchronization signal includes at least a Primary Synchronization Signal (PSS) and a Second Synchronization Signal (SSS).

The downlink reference signal is used at least for the terminal apparatus 1 to perform channel compensation on a downlink physical channel. The downlink reference signal is used at least for the terminal apparatus 1 to calculate downlink channel state information.

According to the present embodiment, the following two types of downlink reference signals are used.

DeModulation Reference Signal (DMRS)

Shared Reference Signal (Shared RS)

The DMRS corresponds to transmission of the PDCCH and/or the PDSCH. The DMRS is multiplexed with the PDCCH or the PDSCH. The terminal apparatus 1 may use the DMRS corresponding to the PDCCH or the PDSCH to perform channel compensation of the PDCCH or the PDSCH. Hereinafter, transmission of both the PDCCH and the DMRS corresponding to the PDCCH are simply referred to as transmission of the PDCCH. Hereinafter, transmission of both the PDSCH and the DMRS corresponding to the PDSCH are simply referred to as transmission of the PDSCH.

The Shared RS may correspond to at least the transmission of the PDCCH. The Shared RS may be multiplexed with the PDCCH. The terminal apparatus 1 may use the Shared RS to perform channel compensation of the PDCCH. Hereinafter, transmission of both the PDCCH and the Shared RS is also simply referred to as transmission of the PDCCH.

The DMRS may be an RS individually configured for the terminal apparatus 1. A sequence of DMRSs may be provided, based at least on parameters individually configured for the terminal apparatus 1. The DMRS may be individually transmitted for the PDCCH and/or the PDSCH. On the other hand, the Shared RS may be an RS configured in common for multiple terminal apparatuses 1. A sequence of Shared RSs may be provided regardless of the parameters individually configured for the terminal apparatus 1. For example, the sequence of Shared RSs may be provided, based on at least some of slot numbers, mini slot numbers, and a cell ID (identity). The Shared RS may be an RS transmitted regardless of whether or not the PDCCH and/or the PDSCH is being transmitted.

The BCH, the UL-SCH, and the DL-SCH are transport channels. A channel used in the Medium Access Control (MAC) layer is referred to as a transport channel. A unit of the transport channel used in the MAC layer is also referred to as a transport block or a MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and modulation processing is performed for each codeword.

The base station apparatus 3 and the terminal apparatus 1 may exchange (transmit and/or receive) a signal in the higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in an RRC layer. The base station apparatus 3 and the terminal apparatus 1 may transmit and/or receive MAC Control Elements (CEs) in the MAC layer. Here, the RRC signaling and/or the MAC CE is also referred to as higher layer signaling.

The PUSCH and the PDSCH are used at least to transmit the RRC signaling and the MAC CE. Here, the RRC signaling transmitted from the base station apparatus 3 on the PDSCH may be RRC signaling common to multiple terminal apparatuses 1 in a cell. The RRC signaling common to multiple terminal apparatuses 1 in the cell is also referred to as common RRC signaling. The RRC signaling transmitted from the base station apparatus 3 on the PDSCH may be RRC signaling dedicated to a certain terminal apparatus 1 (also referred to as dedicated signaling or UE specific signaling). The RRC signaling dedicated to the terminal apparatus 1 is also referred to as dedicated RRC signaling. A cell-specific parameter may be transmitted by using the RRC signaling common to multiple terminal apparatuses 1 in the cell or the RRC signaling dedicated to a certain terminal apparatus 1. A UE-specific parameter may be transmitted by using the RRC signaling dedicated to a certain terminal apparatus 1. The PDSCH including the dedicated RRC signaling may be scheduled by the PDCCH in the first control resource set. The first configuration information may be included in the dedicated RRC signaling. The first configuration information may be configuration information applied to the PDSCH and/or PUSCH scheduled by the PDCCH included at least in the USS. The first configuration information may be included in the common RRC signaling. The first configuration information may be configuration information applied to the PDSCH and/or PUSCH scheduled by the PDCCH included at least in the CSS. The first configuration information need not be included in the common RRC signaling.

A Broadcast Control CHannel (BCCH), a Common Control CHannel (CCCH), and a Dedicated Control CHaneel (DCCH) are logical channels. For example, the BCCH is a higher layer channel used to transmit the MIB. The BCCH is a higher layer channel used to transmit system information. Note that the system information may include System Information Block type 1 (SIB1). The system information may also include System Information (SI) messages including System Information Block type2 (SIB2). The Common Control Channel (CCCH) is a higher layer channel used to transmit information common to multiple terminal apparatuses 1. Here, the CCCH is used for the terminal apparatus 1 that is not in an RRC connected state, for example. The Dedicated Control Channel (DCCH) is a higher layer channel used to transmit individual control information (dedicated control information) to the terminal apparatus 1. Here, the DCCH is used for the RRC-connected terminal apparatus 1, for example.

The BCCH in the logical channel may be mapped to the BCH, DL-SCH, or UL-SCH in the transport channel. The CCCH in the logical channel may be mapped to the DL-SCH or UL-SCH in the transport channel. The DCCH in the logical channel may be mapped to the DL-SCH or UL-SCH in the transport channel.

The UL-SCH in the transport channel is mapped to the PUSCH in the physical channel. The DL-SCH in the transport channel is mapped to the PDSCH in the physical channel. The BCH in the transport channel is mapped to the PBCH in the physical channel.

An example of a method of initial connection will be described below.

The base station apparatus 3 covers a communicable range (or communication area) controlled by the base station apparatus 3. The communicable range is divided into one or more cells (or serving cells, sub-cells, beams, or the like), and communication with the terminal apparatus 1 can be managed for each of the cells. On the other hand, the terminal apparatus 1 selects at least one cell from the multiple cells, and attempts to establish connection to the base station apparatus 3. Here, a first state in which a connection between the terminal apparatus 1 and at least one cell of the base station apparatus 3 is established is also referred to as "RRC Connection". A second state in which the terminal apparatus 1 has not established connection to any cell of the base station apparatus 3 is also referred to as "RRC idle". A third state in which connection is established between the terminal apparatus 1 and at least one cell of the base station apparatus 3 but in which some functions are limited between the terminal apparatus 1 and the base station apparatus 3 is also referred to as "RRC suspended". The RRC suspended is also referred to as RRC inactive.

Figure 4:
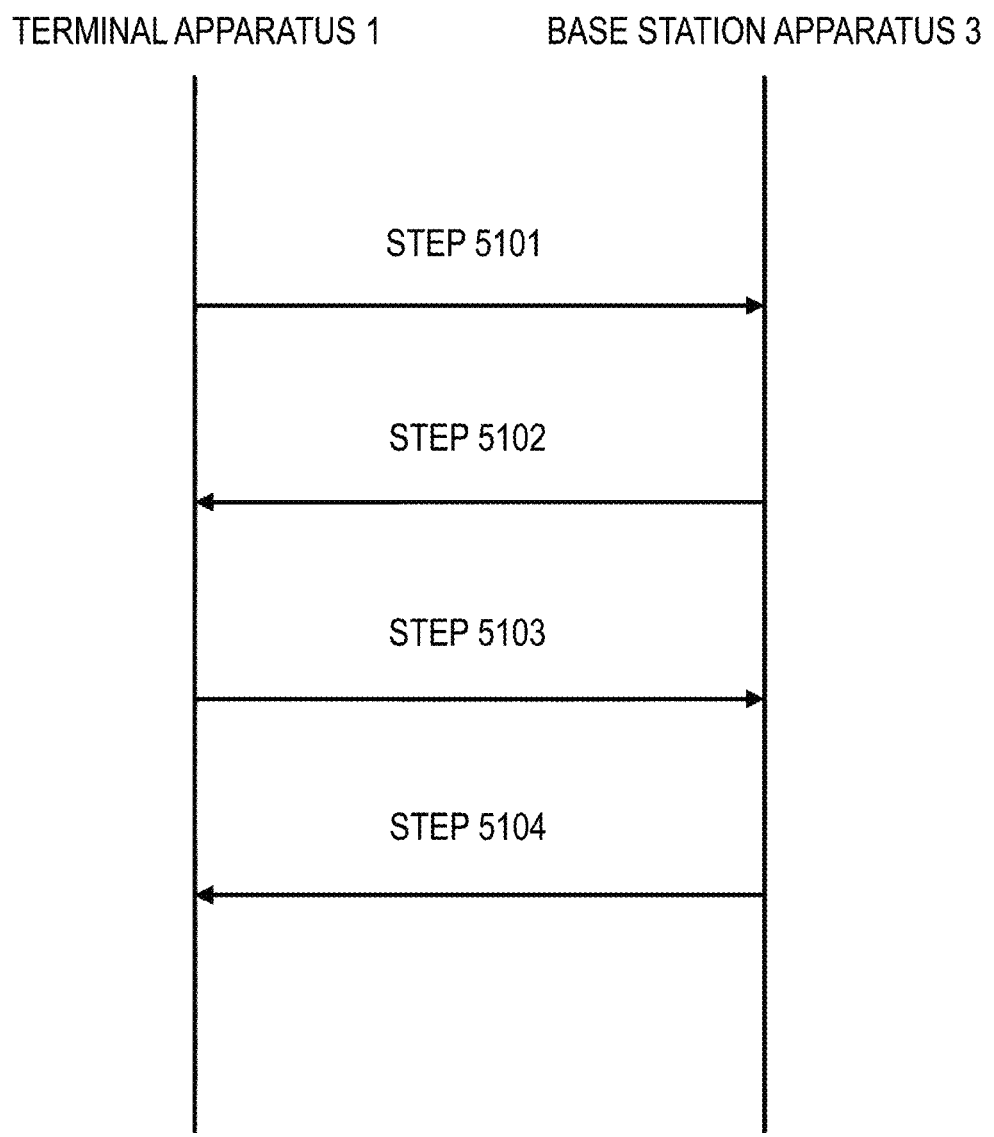
FIG. 4 is a diagram illustrating an example of a first initial connection procedure (4-step contention based RACH procedure) according to an aspect of the present embodiment.

The terminal apparatus 1 in the RRC-idle may attempt to establish a connection with at least one cell of the base station apparatus 3. Here, the cell to which the terminal apparatus 1 attempts to connect is also referred to as a target cell. FIG. 4 is a diagram illustrating an example of a first initial connection procedure (4-step contention based RACH procedure) according to an aspect of the present embodiment. The first initial connection procedure includes at least some of steps 5101 to 5104.

Step 5101 is a step for the terminal apparatus 1 to request, via the physical channel, the target cell to respond for initial connection. Alternatively, step 5101 is a step in which the terminal apparatus 1 provides the first transmission to the target cell via the physical channel. Here, the physical channel may be, for example, the PRACH. The physical channel may be a channel dedicated to requesting a response for initial connection. The physical channel may be the PRACH. In step 5101, a message transmitted from the terminal apparatus 1 via the physical channel is also referred to as a random access message 1.

The terminal apparatus 1 performs downlink time frequency synchronization before performing step 5101. In the first state, a synchronization signal is used for the terminal apparatus 1 to perform the downlink time frequency synchronization.

The synchronization signal may be transmitted with the ID (cell ID) of the target cell. The synchronization signal may be transmitted with a sequence generated, based at least on the cell ID. The synchronization signal including the cell ID may correspond to providing a sequence of synchronization signals based on the cell ID. A beam (or precoder) may be applied to the synchronization signal for transmission.

The beam exhibits a phenomenon in which antenna gain varies depending on the direction. The beam may be provided, based at least on the directivity of the antenna. The beam may also be provided, based at least on phase transformation of a carrier signal. The beam may also be given by application of a precoder.

The terminal apparatus 1 receives the PBCH transmitted from the target cell. The PBCH may be transmitted including an important information block ((Master Information Block (MIB), Essential Information Block (EIB)) including important system information used for the terminal apparatus 1 to connect to the target cell. The important information block is system information. The important information block may include information related to radio frame numbers. The important information block may include information related to a location within a super frame including multiple radio frames (information indicating at least some of System Frame Numbers (SFNs) within the super frame, for example). The PBCH may also include an index of the synchronization signal. The important information block may be mapped to the BCH in the transport channel. The important information block may be mapped to the BCCH in the logical channel.

The terminal apparatus 1 monitors the first control control resource set. The first control resource set is used at least to schedule the PDSCH for the first system information. The first system information may include system information important for the terminal apparatus 1 to connect to the target cell. The first system information may include information related to various configurations for the downlink. The first system information may include information related to various configurations for the PRACH. The first system information may include information related to various configurations for the uplink. The first system information may include information (OFDM or DFT-s-OFDM) indicating a signal waveform configured for transmission of random access message 3. The first system information may include at least a portion of system information other than the information included in the MIB. The first system information may be mapped to the BCH in the transport channel. The first system information may be mapped to the BCCH in the logical channel. The first system information may include at least System Information Block type1 (SIB1). The first system information may include at least System Information Block type1 (SIB2). The first control resource set may be used to schedule the PDSCH for random access message 2. Note that the SIB1 may include information related to measurements required for RRC connection. The SIB2 may include information related to a channel common to and/or shared among multiple terminal apparatuses 1 in the cell.

Step 5102 is a step in which the base station apparatus 3 provides, to the terminal apparatus 1, a response to random access message 1. The response is also referred to as random access message 2. Random access message 2 may be transmitted via the PDSCH. The PDSCH including random access message 2 is scheduled by the PDCCH. CRC bits included in the PDCCH may be scrambled with a Rondom access-RNTI (RA-RNTI).

Random access message 2 may be transmitted with a special uplink grant. The special uplink grant is also referred to as a random access response grant. The special uplink grant may be included in the PDSCH including random access message 2. The random access response grant may be transmitted with at least a Temporary C-RNTI. The RA-RNTI may be an RNTI used to monitor random access message 2. The RA-RNTI may be provided, based at least on a preamble index of random access message 1 transmitted by the terminal apparatus 1. The RA-RNTI may be provided, based at least on a radio resource used for transmission of random access message 1 (for example, may include some or all of a PRB index, a subcarrier index, an OFDM symbol index, a slot index, and a subframe index). The Temporary C-RNTI may be an RNTI used to monitor random access message 4. The Temporary C-RNTI may be included in a random access response grant.

Step 5103 is a step in which the terminal apparatus 1 transmits a request for RRC connection to the target cell. The request for RRC connection is also referred to as random access message 3. Random access message 3 may be transmitted via the PUSCH scheduled by the random access response grant. Random access message 3 may include an ID used to identify the terminal apparatus 1. The ID may be managed by the higher layer. The ID may be an SAE Temporary Mobile Subscriber Identity (S-TMSI). Random access message 3 may be mapped to the CCCH in the logical channel. Random access message 3 may be mapped to the UL-SCH in the transport channel.

Step 5104 is a step in which the base station apparatus 3 transmits a Contention resolution message to the terminal apparatus 1. The contention resolution message is also referred to as random access message 4. After transmitting random access message 3, the terminal apparatus 1 monitors the PDCCH scheduling the PDSCH including random access message 4. Random access message 4 may include a contention avoidance ID. Here, the contention avoidance ID is used to resolve a contention in which multiple terminal apparatuses 1 transmit signals using the same radio resource. The contention avoidance ID is also referred to as a UE contention resolution identity. Random access message 4 may be mapped to the CCCH in the logical channel. Random access message 4 may be mapped to the DL-SCH in the transport channel.

In step 5104, the terminal apparatus 1 having transmitted random access message 3 including an ID (S-TMSI, for example) used to identify the terminal apparatus 1 monitors random access message 4 including the contention resolution message. In a case that the contention avoidance ID included in random access message 4 is equal to the ID used to identify the terminal apparatus 1, the terminal apparatus 1 may consider that the contention resolution has been successfully completed and set the value of the Temporary C-RNTI in the C-RNTI field. The terminal apparatus 1 with the value of the Temporary C-RNTI set in the C-RNTI field is considered to have successfully completed the RRC connection (or the initial connection procedure).

The transmission process 3000 included in the base station apparatus 3 and/or the terminal apparatus 1 will be described below.

Figure 5:
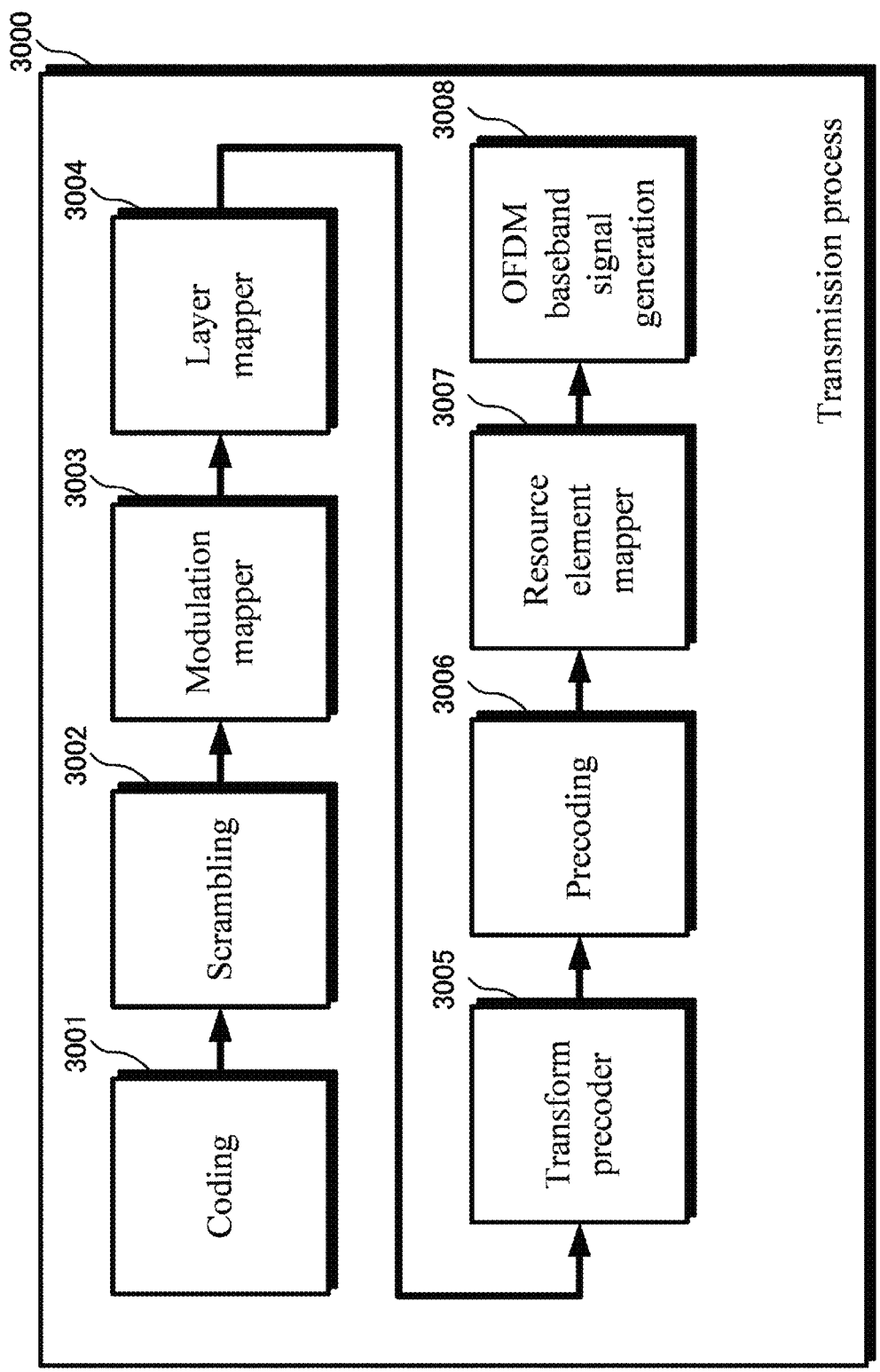
FIG. 5 is a diagram illustrating an example of a constitution of a transmission process 3000 of a physical layer.

FIG. 5 is a diagram illustrating an example of a configuration of the transmission process 3000 in the physical layer. The Transmission process 3000 includes at least some or all of a coding processing unit (coding) 3001, a scrambling processing unit (Scrambling) 3002, and a modulation map processing unit (Modulation mapper) 3003, a layer map processing unit (Layer mapper) 3004, a transmission precode processing unit (Transform precoder) 3005, a precode processing unit (Precoder) 3006, a resource element map processing unit (Resource element mapper) 3007, and a baseband signal generation processing unit (OFDM baseband signal generation) 3008.

The coding processing unit 3001 may include a function of converting a transport block (or data blocks, transport data, transmission data, transmission codes, transmission blocks, payloads, information, information blocks, or the like) sent (or notified, delivered, transmitted, passed, or the like) from the higher layer to coded bits by error correction coding processing. Error correction coding includes at least some or all of a Turbo code, a Low Density Parity Check (LDPC) code, a convolutional code (such as a convolutional code or Tail biting convolutional code), and a repetition code. The coding processing unit 3001 includes a function of transmitting coded bits to the scrambling processing unit 3002. Operations of the coding processing unit 3001 are described below in detail.

The scrambling processing unit 3002 may include a function to convert the coded bits into scramble bits by scrambling processing. The scrambled bits may be obtained by calculating the sum of the coded bits and a scrambling sequence modulo 2. In other words, the scrambling may be to calculate the sum of the coded bits and the scrambling sequence modulo 2. The scrambling sequence may be a sequence generated by a pseudo-random function, based on a unique sequence (e.g., the C-RNTI).

The modulation map processing unit 3003 may include a function to convert the scramble bits into a modulated sequence (modulation symbols) by modulation map processing. The modulation symbol may be obtained by performing modulation processing such as Quaderature Phase Shift Keying (QPSK), 16 Quaderature Amplitude Modulation (QAM), 64QAM, and 256QAM, on the scramble bits.

The layer map processing unit 3004 may include a function to map the modulation symbols to each layer. The layer may be an indicator of the multiplicity of physical layer signals in a spatial region. For example, in a case that the number of layers is one, this means that spatial multiplexing is not performed. In a case that the number of layers is two, this means that two types of modulation symbols are spatially multiplexed.

For example, the transmission precode processing unit 3005 may include a function to generate transmission symbols by performing transmission precode processing on the modulation symbols mapped to each layer. The modulation symbols and/or the transmission symbols may be complex-valued symbols. The transmission precode processing includes processing by DFT spread, DFT spreading, or the like. In the transmission precode processing unit 3005, whether the transmission precode processing is performed or not may be provided, based on the information included in the higher layer signaling. In the transmission precode processing unit 3005, whether the transmission precode processing is performed or not may be provided, based at least on the information included in the first system information. In the transmission precode processing unit 3005, whether the transmission precode processing of random access message 3 is performed or not may be provided, based at least on the information included in the first system information. In the transmission precode processing unit 3005, whether the transmission precode processing is performed or not may be provided, based on the information included in the control channel. In the transmission precode processing unit 3005, whether the transmission precode processing is performed or not may be provided based on information configured in advance.

For example, the precode processing unit 3006 may include a function to multiply the transmission symbols by a precoder to generate transmission symbols for each transmit antenna port. The transmit antenna port is a logical antenna port. One transmit antenna port may include multiple physical antennas. The logical antenna port may be identified by the precoder.

The antenna port is defined as an antenna port that allows a channel conveyed by a certain symbol in a certain antenna port to be inferred from a channel conveyed by another symbol in the same antenna port. That is, for example, in a case that a first physical channel and a first reference signal are conveyed by symbols in the same antenna port, a channel compensation of the first physical channel may be performed by using the first reference signal. Here, the same antenna port also means that an antenna port number (the number for identifying an antenna port) may be the same. Here, the symbols may be, for example, at least some of the OFDM symbols. The symbols may be resource elements.

For example, the resource element map processing unit 3007 may function to perform processing of mapping transmission symbols mapped to the transmit antenna port to resource elements. Details of the method of mapping to the resource elements in the resource element map processing unit 3007 will be described below.

The baseband signal generation processing unit 3008 may include a function to convert the transmission symbols mapped to the resource elements into a baseband signal. The processing of converting the transmission symbols into the baseband signal may include, for example, inverse Fourier transform processing (Inverse Fast Fourier Transform (IFFT)), window processing (Windowing), filtering processing (Filter processing), and the like.

Hereinafter, operations of the coding processing unit 3001 will be described in detail.

Figure 6:
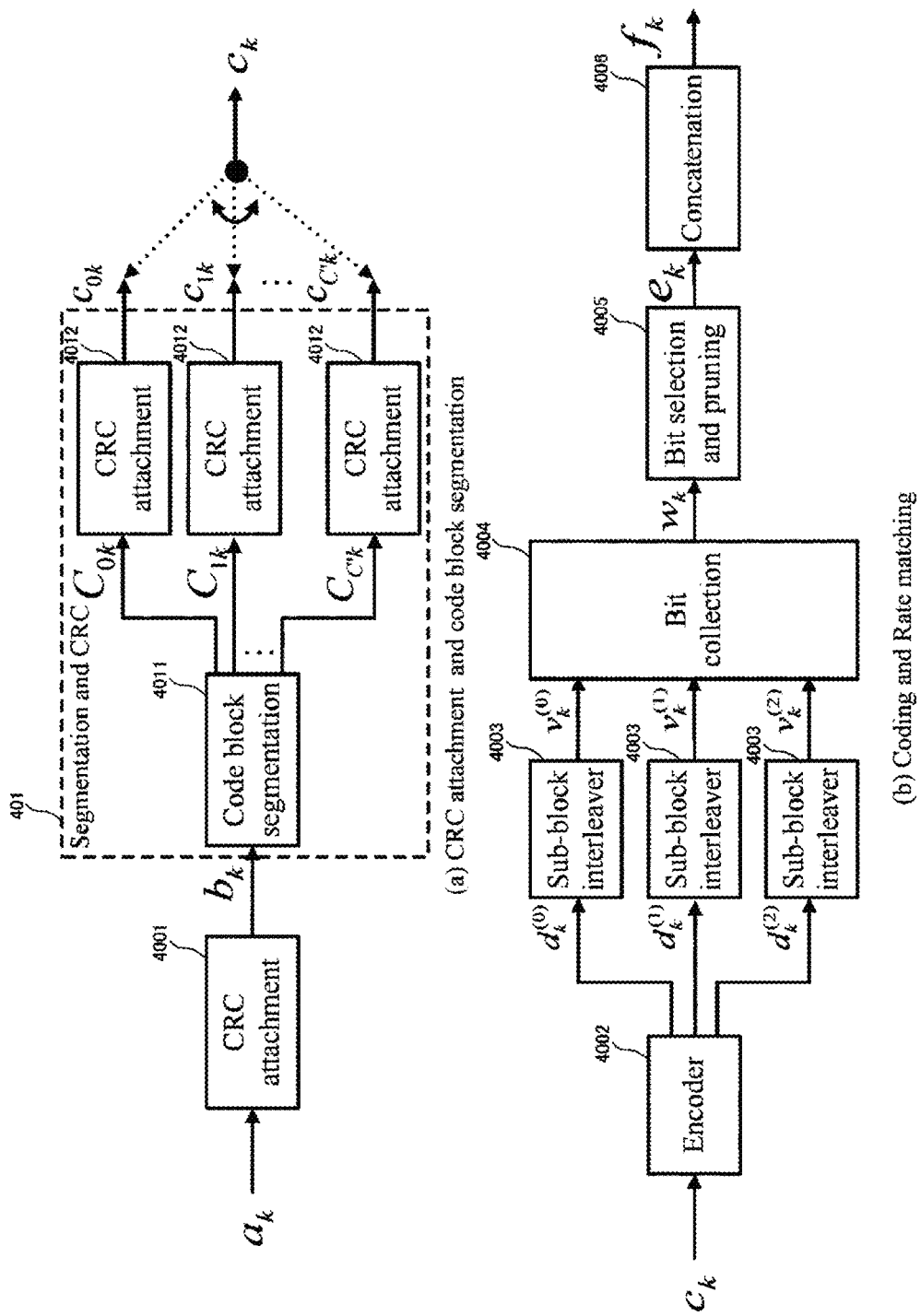
FIG. 6 is a diagram illustrating a configuration example of a coding processing unit 3001 according to the present embodiment.

FIG. 6 is a diagram illustrating a configuration example of the coding processing unit 3001 according to the present embodiment. The coding processing unit 3001 includes at least one of a CRC attachment unit 4001, a segmentation and CRC attachment (Segmentation and CRC) unit 401, a coding (Encoder) unit 4002, a Sub-block interleaver unit 4003, a Bit collection unit 4004, a Bit selection and pruning unit 4005, and a Concatenation unit 4006. Here, the segmentation and CRC attachment unit 401 includes at least one of a code block segmentation unit 4011 and one or more CRC attachment units 4012.

A transport block $a_k$ is input to the CRC attachment unit 4001. The CRC attachment unit 4001 may generate a first CRC sequence as redundancy bits for error detection, based on the input transport block. The generated first CRC sequence is attached to the transport block. A first sequence $b_k^0$ including the transport blocks to which the first CRC sequence is attached is output from the CRC attachment unit 4001.

The first CRC sequence may be a CRC sequence corresponding to the transport block. The first CRC sequence may be used to determine whether the transport block has been successfully decoded. The first CRC sequence may be used to detect errors in the transport block. The first sequence $b_k^0$ may be a transport block to which the first CRC sequence is attached.

The first sequence $b_k^0$ may be segmented into one or more first sequence groups. The first sequence group is also referred to as a Code Block Group (CBG).

Figure 7:
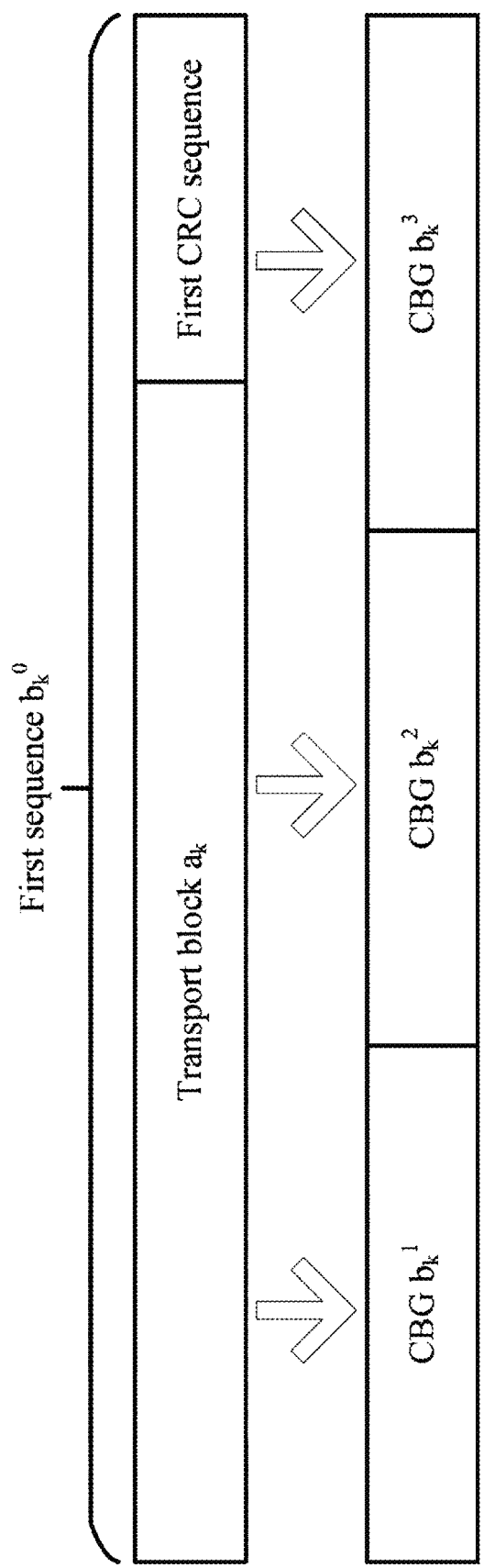
FIG. 7 is a diagram illustrating an example of an operation in which a first sequence $b_k^0$ is segmented into multiple first sequence groups $b_k^n$ (n=1 to 3 in FIG. 7) according to an aspect of the present embodiment.

FIG. 7 is a diagram illustrating an example of an operation in which the first sequence $b_k^0$ is segmented into multiple first sequence groups $b_k^n$ (n=1 to 3 in FIG. 7) according to an aspect of the present embodiment. The first sequence groups $b_k^n$ may be sequences of an equal length or of different lengths. The first CRC sequence may be mapped to only one first sequence group (first sequence group $b_k^n$ in FIG. 7).

Figure 8:
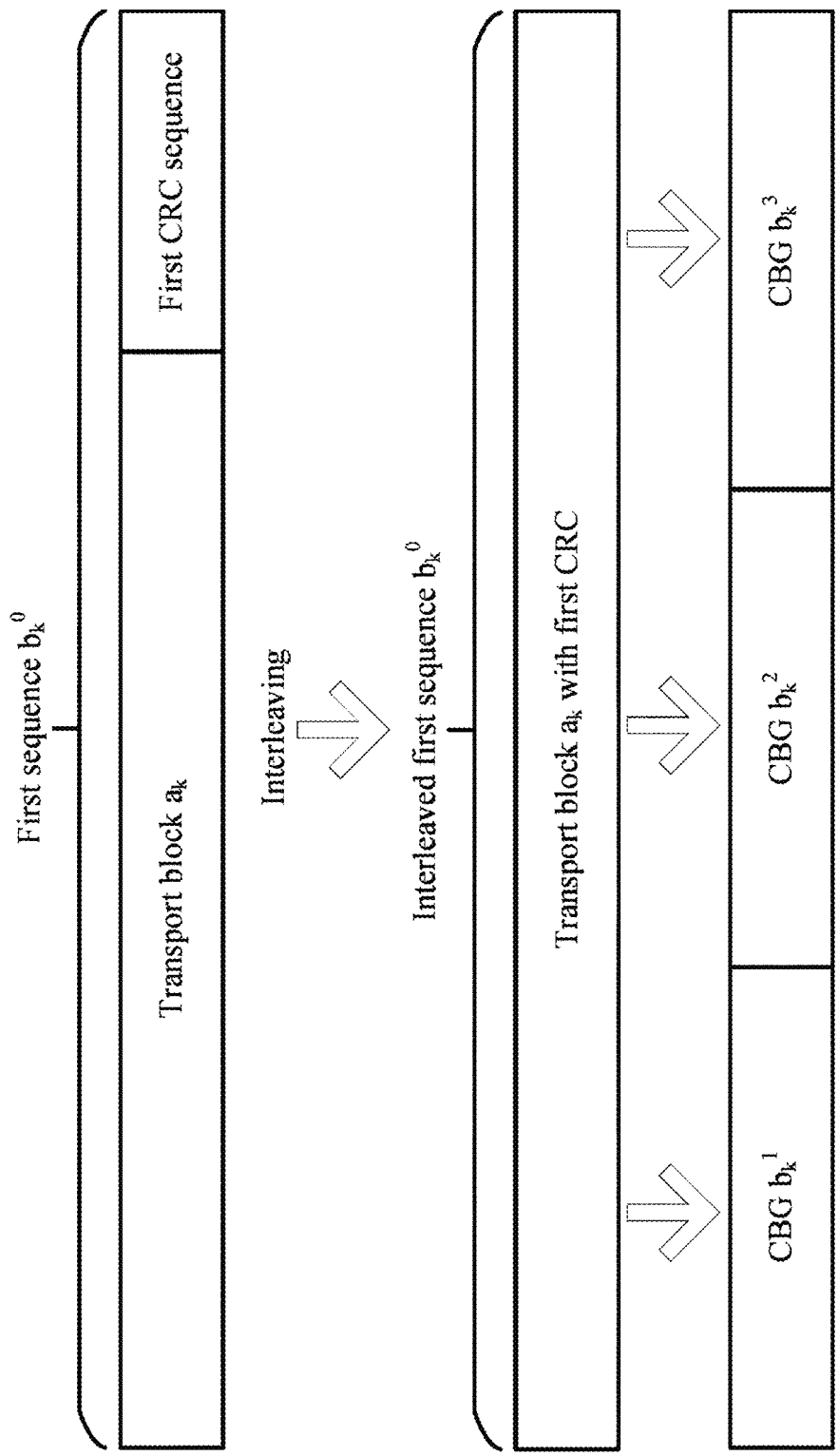
FIG. 8 is a diagram illustrating an example of an operation in which the first sequence $b_k^0$ is segmented into multiple first sequence groups $b_k^n$ (n=1 to 3 in FIG. 8) according to an aspect of the present embodiment.

FIG. 8 is a diagram illustrating an example of an operation in which the first sequence $b_k^0$ is segmented into multiple first sequence groups $b_k^n$ (n=1 to 3 in FIG. 8) according to an aspect of the present embodiment. The first sequence $b_k^0$ is sorted (interleaved) based on a first reference, and interleaved first sequence $b_k^0$. The interleaved first sequence $b_k^0$ may be segmented into multiple first sequence groups $b_k^n$. In other words, the first sequence $b_k^0$ may be different in order from the interleaved first sequence $b_k^0$.

The first reference may include a pseudo-random function (e.g., M sequence, Gold sequence, or the like). Sorting based on the first reference may include first sorting. The sorting based on the first reference may be bit interleave based on the first reference.

Figure 9:
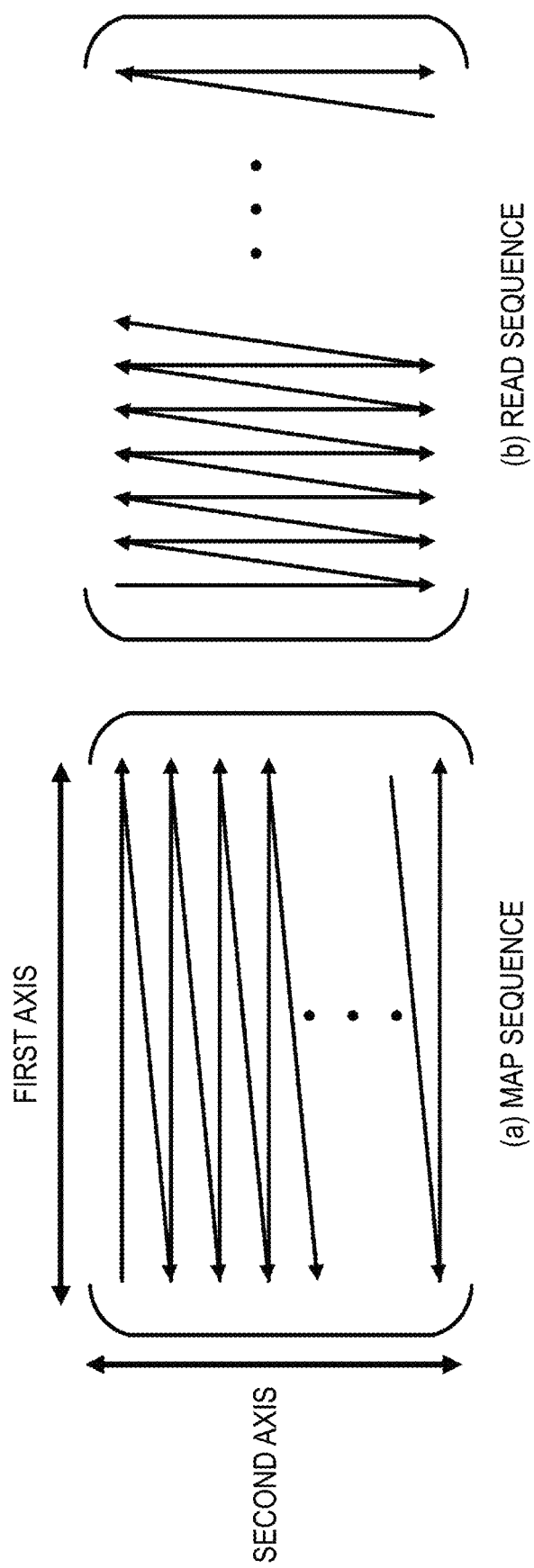
FIG. 9 is an example illustrating a first sorting method according to an aspect of the present embodiment.

FIG. 9 is an example illustrating a first sorting method according to an aspect of the present embodiment. The sequence may be mapped to a two-dimensional block B as illustrated in FIG. 9. The block B includes at least a first axis and a second axis. The first axis is also referred to as a horizontal axis or a column. The second axis is also referred to as a vertical axis or a row. In the block B, a point (entry) identified by a point on the first axis and a point on the second axis is a unit of mapping of a sequence. The sequence may be mapped in a first axis direction on the block B (illustrated in FIG. 9(*a*)). Mapping (writing) the sequence in the first axis direction may correspond to mapping the sequence in a first-axis prioritized manner. The sequence mapped to the block B may then be read in a second axis direction.

In other words, the first sorting may include at least the following procedure.
  (a) An input sequence is mapped in the first axis direction.
  (b) The sequence mapped in the first axis direction is read in the second axis direction.

The sorting based on the first reference may be performed for each first sequence group $b_k^n$.

A second CRC sequence generated, based at least on the first sequence group $b_k^n$ may be attached to the first sequence group $b_k^n$. The second CRC sequence may be different in length from the first CRC sequence. The second CRC sequence and the first CRC sequence may be different from each other in generation method. The second CRC sequence may be used to determine whether or not the n-th first sequence group $b_k^n$ has been successfully decoded. The second CRC sequence may be used to detect errors in the n-th first sequence group $b_k^n$. The second CRC sequence may be a second CRC sequence attached to the n-th first sequence group $b_k^n$. In a case that the number of first sequence groups $b_k^n$ is equal to the number $N_{CB}$ of code blocks or the number of first sequence groups $b_k^n$ is greater than the number $N_{CB}$ of code blocks, the second CRC sequence need not be attached to each of the first sequence groups $b_k^n$. In a case that the number of first sequence groups $b_k^n$ is smaller than the number $N_{CB}$ of code blocks, the second CRC sequence may be attached to each of the first sequence groups $b_k^n$. For example, in a case that the first sequence group $b_k^n$ includes only one code block, the second CRC sequence need not be attached to the first sequence group $b_k^n$. In a case that the first sequence group $b_k^n$ includes two or more code blocks, the second CRC sequence may be attached to the first sequence group $b_k^n$. In a case that the number of first sequence groups $b_k^n$ corresponding to the transport block is one, the second CRC sequence need not be attached to the first sequence group $b_k^n$.

The second sequence $b_k$ may be input to the code block segmentation unit 4011. The second sequence $b_k$ input into the code block segmentation unit 4011 may be input for each of the first sequence groups $b_k^n$. In a case that the first sequence $b_k^0$ is segmented into the first sequence groups $b_k^n$, the second sequence $b_k$ input into the code block segmentation unit 4011 may correspond to the n-th (n is an integer of 1 or greater) first sequence group $b_k^n$. In a case that the first sequence $b_k^0$ is not segmented into the first sequence groups $b_k^n$, the second sequence $b_k$ input into the code block segmentation unit 4011 may correspond to the first sequence $b_k^0$.

FIG. 10 is a diagram illustrating an example of a first procedure for calculating the number of code blocks in the code block segmentation unit 4011 according to an aspect of the present embodiment. B denotes the number of bits in the second sequence $b_k$. $N_{CB}$ denotes the number of code blocks in the second sequence $b_k$. B' denotes the sum of the number of bits in a third CRC sequence and the second sequence $b_k$ attached to each code block. L denotes the number of bits in the third CRC sequence attached to one code block.

In a case that the number of bits B in the second sequence $b_k$ is equal to or smaller than a maximum code block length Z, the number of bits in the third CRC sequence L=0, the number of code blocks $N_{CB}=1$, and B'=B. On the other hand, in a case that the number of bits B in the second sequence $b_k$ is greater than the maximum code block length Z, L=24, and the number of code blocks may be given by $N_{CB}$=floor (B/(Z−L)). Here, floor (*) is a function that outputs a minimum integer under the condition that the integer is not smaller than *. Floor (*) is also referred to as a ceiling function.

The number of bits B in the second sequence $b_k$ may be given by the sum of the number of bits A in the first sequence $a_k$ and the number of bits P in the first CRC bits $p_k$. In other words, the number of bits B in the second sequence $b_k$ may be given by B=A+P.

The number of bits B in the second sequence $b_k$ may include the number of bits in the second CRC sequence.

The maximum code block length Z may be 6144 or 8192. The maximum code block length Z may be a value other than those described above. The maximum code block length Z may be given, based at least on a method for error correction coding used for the coding procedure. For example, the maximum code block length Z may be 6144 in a case that turbo codes are used for the coding procedure. For example, the maximum code block length Z may be 8192 in a case that Low Density Parity Check (LDPC) codes are used for the coding procedure. The LDPC codes may be Quasi-Cyclic LDPC (QC-LDPC) codes. The LDPC codes may be LDPC-Convolutional Codes (LDPC-CCs) coding.

The code block segmentation unit 4011 segments the second sequence $b_k$ into $N_{CB}$ code blocks $C_{rk}$, based at least on the calculated number of code blocks $N_{CB}$. Here, r denotes an index of the code block. The index r of the code block is given by an integer value included in a range from 0 to $N_{CB}-1$.

Code block segmentation processing by the code block segmentation unit 4011 may provide at least a first code block with a first code block size and a second code block with a second code block size.

The second CRC attachment unit 4012 may include a function to attach a third CRC sequence for each code block. For example, in a case that the number of code blocks $N_{CB}=1$, the third CRC sequence need not be attached to the code block. This corresponds to L=0 in a case that the number of code blocks $N_{CB}=1$. On the other hand, in a case that the number of code blocks $N_{CB}$ is greater than 1, a third CRC sequence with L bits may be attached to each of the code blocks. The number of code blocks $N_{CB}$ being greater than one corresponds to the second sequence $b_k$ being segmented into multiple code blocks. An output of the second CRC attachment unit 4012 is referred to as a code block $c_{rk}$. The code block $c_{rk}$ is the r-th code block.

A code block group (CBG) may include one or more code blocks. The $N_{CB}$ code blocks may be segmented into $N_{CBG}$ CBGs. The $N_{CBG}$ is the number of CBGs included in the transport block. For example, the number of CBGs $N_{CBG}$ included in the transport block may be given, based on the higher layer signaling and/or a description in specifications or the like, and the number of code blocks per CBG $N_{CB\ per\ CBG}$ may be given, based at least on the transport block size. The number of code blocks $N_{CB}^{per}$ CBG in one CBG is given, based on the higher layer signaling and/or a description in specifications or the like, and the number of CBGs $N_{CBG}$ included in the transport block may be given, based at least on the transport block size. The number of code blocks $N_{CB\ per\ CBG}$ in one CBG and the number of CBGs $N_{CBG}$ included in the transport block may be given, based at least on TBS. The TBS is an abbreviation for the Transport Block Size.

The transport block may include at least a first CBG and a second CBG. The first CBG may be a CBG including $N_{CB\ per\ CBG}$ code blocks. The second CBG may be a CBG including fewer code blocks than that included in the first CBG. The second CBG may be a CBG including $N_{CB\ per\ CBG}-1$ code blocks.

Hereinafter, assuming that the first code block size is larger than the second code block size, a method for configuring CBGs will be described.

Figure 11:
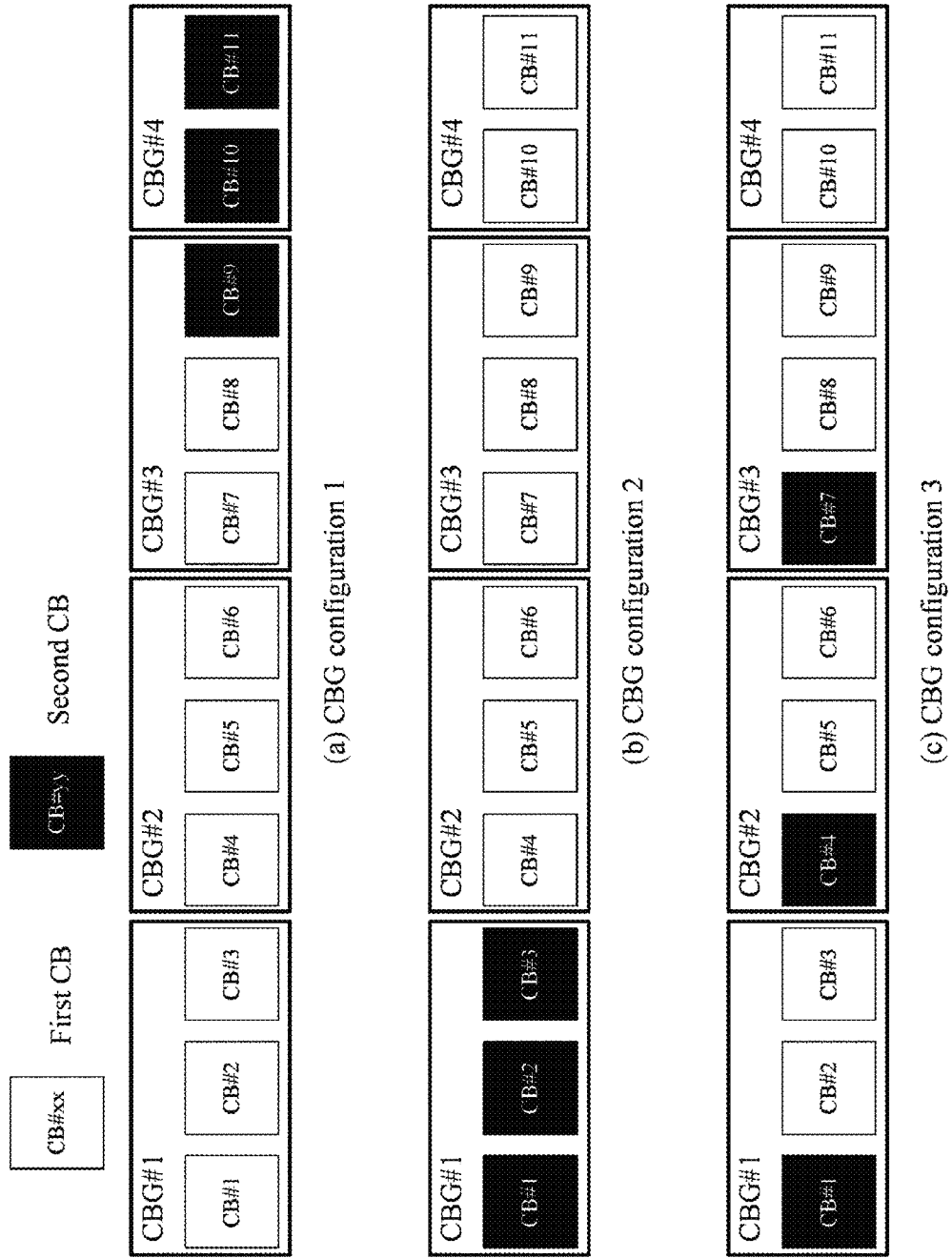
FIG. 11 is a diagram illustrating a configuration example of CBGs according to an aspect of the present embodiment.

FIG. 11 is a diagram illustrating a configuration example of CBGs according to an aspect of the present embodiment. In FIG. 11, blank blocks indicate first code blocks and filled blocks indicate second code blocks. In FIG. 11, the number of CBGs is configured to 4, and each CBG includes three or two code blocks. In other words, in FIG. 11, CBG #1, CBG #2, and CBG #3 are included in the first CBG. In FIG. 11, CBG #4 is included in the second CBG. In an example illustrated in FIG. 11(a), the first CBG includes many first code blocks and the second CBG includes only the second code blocks. In such a case, for example, there is a problem in that a significant difference in the number of bits included in CBG #1 and CBG #4 leads particularly to deterioration of resistance to burst errors in CBG #4, which is specific to wireless channels.

In FIG. 11(b), CBG #1 includes only the second code blocks and CBG #2 to CBG #4 include the first code blocks. This enables a reduction in the difference in the number of bits included in the first CBG and the second CBG.

In FIG. 11 (c), CBG #1 to CBG #3 include the first code block and the second code blocks, and CBG #4 includes the first code blocks. This enables a reduction in the difference in the number of bits included in the first CBG and the second CBG.

The second sequence $b_k$ may include at least one or more first code blocks and one or more second code blocks. The code block size of the first code block may be greater than the code block size of the second code block. Each of the one or more first code blocks and one or more second code blocks may be included in any of multiple CBG.

Each of the one or more first code blocks and the one or more second code blocks may be mapped to any of multiple CBG. The multiple CBGs may include the first CBG and the second CBG. The number of code blocks included in the first CBG may be greater than the number of code blocks included in the second code block. For example, the number of code blocks included in the first CBG may be $N_{CB\ per\ CBG}$. The number of code blocks included in the second CBG may be $N_{CB\ per\ CBG}-1$. In other words, the difference between the number of code blocks included in the first CBG and the number of code blocks included in the second CBG may be at most one.

The first total of the number of first code blocks and the number of second code blocks included in each of the one or more first CBGs may be greater than a second total of the number of first code blocks and the number of second code blocks included in each of the one or more second CBGs. The CBG including the largest number of second code blocks, may be one of the one or more first CBGs.

The CBG including the smallest number of second code blocks may be one of the one or more second CBGs.

The total value of the number of first code blocks included in the one or more second CBGs may be greater than the total value of the number of first code blocks included in the one or more first CBGs.

The total value of the number of second code blocks included in the one or more first CBGs may be greater than the total value of the number of second code blocks included in the one or more second CBGs.

A value obtained by dividing, by the number of the second CBGs, the total value of the number of first code blocks included in the one or more second CBGs may be greater than a value obtained by dividing, by the number of first CBGs, the total value of the number of first code blocks included in the one or more first CBGs.

A value obtained by dividing, by the number of first CBGs, the total value of the number of second code blocks included in the one or more first CBGs may be greater than a value obtained by dividing, by the number of the second CBGs, the total value of the number of second code blocks included in the one or more second CBG.

Figure 12:
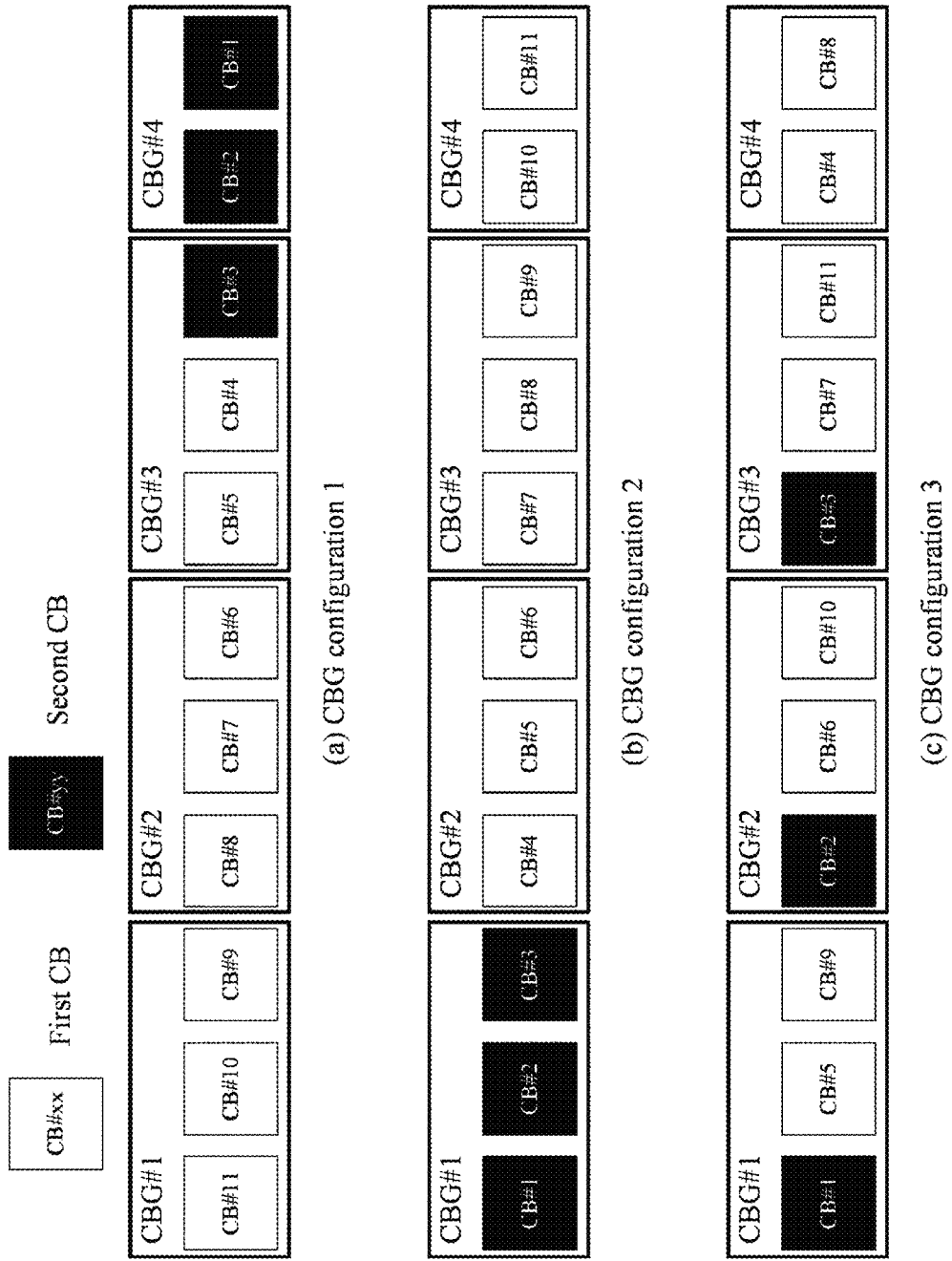
FIG. 12 is a diagram illustrating a configuration example of CBGs according to an aspect of the present embodiment.

FIG. 12 is a diagram illustrating a configuration example of CBGs according to an aspect of the present embodiment. In FIG. 12, the indexes of the second code blocks is #1 to #3 and the indexes of the first code block is #4 to #11. In other words, in FIG. 12, the indexes of the code blocks are assigned such that the index of second code block is smaller than the index of first code block. In other words, the index of second code block may be smaller than the index of first code block.

The indexes assigned to the first CBG may be smaller than the indexes assigned to the second CBG.

In FIG. 12(a), the indexes of the code blocks included in CBG #4 are smaller than the indexes of the code blocks included in CBG #1 to CBG #3. In FIG. 12(a), for example, there is a problem in that a significant difference in the number of bits included in CBG #1 and CBG #4 leads particularly to deterioration of resistance to burst errors in CBG #4, which is specific to wireless channels.

In FIG. 12(b), the indexes of the code blocks included in CBG #1 to CBG #3 are smaller than the indexes of the code blocks included in CBG #4. This enables a reduction in the difference in the number of bits included in the first CBG and the second CBG.

In FIG. 12(c), the minimum value of the indexes of the code blocks included in CBG #1 to CBG #3 is smaller than the minimum value of the indexes of the code blocks included in CBG #4. This enables a reduction in the difference in the number of bits included in the first CBG and the second CBG.

In a case that the indexes assigned to the first CBG is smaller than the indexes assigned to the second CBG and the indexes of the second code blocks are smaller than the indexes of the first code blocks, the indexes of the code blocks included in the first CBG may be smaller than the indexes of the code blocks included in the second CBG.

In a case that the indexes assigned to the first CBG are smaller than the indexes assigned to the second CBG and the indexes of the second code blocks are smaller than the indexes of the first code blocks, the minimum value of the indexes of the code blocks included in the first CBG may be smaller than the minimum value of the indexes of the code blocks included in the second CBG.

In a case that the indexes assigned to the first CBG are larger than the indexes assigned to the second CBG and the indexes of the second code blocks are larger than the indexes of the first code blocks, the indexes of the code blocks included in the first CBG may be larger than the indexes of the code blocks included in the second CBG.

In a case that the indexes assigned to the first CBG are larger than the indexes assigned to the second CBG and the indexes of the second code blocks are larger than the indexes of the first code blocks, the maximum value of the indexes of the code blocks included in the first CBG may be larger than the maximum value of the indexes of the code blocks included in the second CBG.

The second CRC sequence may be attached to the CBG. The second CRC sequence may be provided, based at least on a bit sequence included in the second CRC sequence. In a case that the number of CBGs $N_{CBG}$ and the number of code blocks $N_{CB}$ are equal or the number of CBGs $N_{CBG}$ is greater than the number of code blocks $N_{CB}$, the second CRC sequence need not be attached to the CBG. In a case that the number $N_{CBG}$ of CBGs is smaller than the number of code blocks $N_{CB}$, a second CRC sequence may be attached to the CBG. For example, in a case that the number of code blocks $N_{CB\ per\ CBG}$ included in one CBG is 1, the second CRC sequence need not be attached to the CBG. In a case that the number of the code blocks $N_{CB\ per\ CBG}$ included in one CBG is two or more, the second CRC sequence may be attached to the CBG. In a case that the number of CBGs $N_{CBG}$ is 1, the second CRC sequence need not be attached to the CBG.

Sorting based on the first reference may be performed on each CBG.

The coding unit 4002 includes a function to apply error correction coding to a given code block $c_k$. The r-th code block $c_{rk}$ is input to the given code block $c_k$. The coding unit 4002 performs error correction coding on the code block $c_k$, and outputs a Coded bit sequence. In a case that turbo codes are used as an error correction coding scheme, the coded bit sequence is $d_k^{(0)}$, $d_k^{(1)}$, and $d_k^{(2)}$. Here, $d_k^{(0)}$ is also referred to as a systematic bit. $d_k^{(1)}$ and $d_k^{(2)}$ are also referred to as parity bits.

The coded bit sequence may include one or more sequences. The number of sequences constituting the coded bit sequence is also referred to as "$N_{seq}$". In a case that the turbo codes are used as an error correction coding scheme, the coded bit sequence may include three sequences ($d_k^{(0)}$, $d_k^{(1)}$, and $d_k^{(2)}$). In other words, in a case that the turbo codes are used as the error correction coding scheme, $N_{seq}=3$ may be used. In a case that LDPC codes are used as an error correction coding scheme, the coded bit sequence may include two sequences ($d_k^{(0)}$ and $d_k^{(1)}$). In other words, in a case that the LDPC codes are used as an error correction coding scheme, $N_{seq}=2$ may be used. In a case that the LDPC codes are used as an error correction coding scheme, $N_{seq}$ may be a value other than 2. For example, in a case that the LDPC codes are used as an error correction coding scheme, $N_{seq}$ may be 1.

The coded bit sequence output from the coding unit 4002 is input to the sub-block interleaver unit 4003 or the bit collection unit 4004. Whether the coded bit sequence output from the coding unit 4002 is input to the sub-block interleaver unit 4003 or not may be provided, based at least on the applied error correction coding scheme.

The sub-block interleaver unit 4003 sorts (interleaves) the input coded bit sequence and outputs a rearrangement bit sequence $v_k^{(n)}$. n is an integer within a range from 0 to $N_{seq}-1$. The sorting of the coded bits by the sub-block interleaver unit 4003 is based on first sorting. The number of elements $C_{subblock}$ in the column (first axis) of the sub-block interleaver is 32. The number of elements $R_{subblock}$ in the row (second axis) of the sub-block interleaver may be the smallest integer that satisfies following relationship 1: Here, D is the number of bits in each of the sequences $d_k^{(n)}$.

$$D \leq (R_{subblock} \times C_{subblock}) \qquad \text{Relationship 1}$$

The number of bits Ku in each of the rearrangement bit sequences $v_k^{(n)}$, which is an output from the sub-block interleaver unit 4003, may be given by Equation 2 below.

$$K_\pi(R_{subblock} \times C_{subblock}) \qquad \text{Equation 2}$$

For example, in the sub-block interleaver unit 4003, whether first permutation processing is applied or not may be provided, based on the input coded bit sequence. For example, the first permutation processing need not be applied to the input coded bit sequence $d_k^{(0)}$ or $d_k^{(1)}$. On the other hand, the first permutation processing may be applied to the input coded bit sequence $d_k^{(2)}$.

The first permutation processing may be sorting in the column direction (inter-column permutation). A first pattern P used for the first permutation processing applied in the sub-block interleaver unit 4003 may be P=[0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31].

In a case that the coded bit sequence may be input to the bit collection unit 4004, the rearrangement bit $v_k^{(n)}=d_k^{(n)}$.

The bit collection unit 4004 generates a Virtual circular buffer, based on sorting (rearrangement) of the rearrangement bit sequence $v_k^{(n)}$. For example, the virtual circular buffer $w_k$ may be generated, based on $w_k=v_k^{(0)}$, $w_{K\pi+2k}=v_k^{(1)}$, $w_{K\pi+2k+1}=v_k^{(2)}$. Here, $K_\pi$ is the number of bits in the $v_k^{(0)}$. For the turbo codes, $K_w$ is a value represented by $K_w=3K_\pi$. The bit collection unit 4004 outputs the virtual circular buffer $w_k$.

The virtual circular buffer $w_k$ may be generated by sorting $N_{seq}$ rearrangement bit sequence $v_k^{(n)}$, based on a prescribed procedure. The virtual circular buffer $w_k$ is input to the bit selection and pruning unit 4005.

The bit selection and pruning unit 4005 performs a rate matching operation on the virtual circular buffer $w_k$ to generate a rate matching sequence $e_k$. FIG. 14 is a diagram illustrating an example of the rate matching operation of the bit selection and pruning unit 4005 according to an aspect of the present embodiment. A rate matching sequence $e_k$ is obtained from the virtual circular buffer $w_k$. The number of bits in the rate matching sequence $e_k$ is E. The number of bits E in the rate matching sequence $e_k$ is given, based at least on resource allocation information for the transport block (or CBG), or the like. $rv_{idx}$ in FIG. 14 is a redundancy version (RV) number for transmission of a corresponding transport block. The RV number may be indicated by information included in the downlink control information. The RV number may be configured, based at least on the higher layer signaling. $N_{cb}$ is a soft buffer size per code block and may be expressed in the number of bits. The $N_{cb}$ may be given by following Equation 3.

$$N_{cb} = \min\left(\left\lfloor \frac{N_{IR}}{N_{CB}} \right\rfloor, K_w \right) \qquad \text{Equation 3}$$

Here, $N_{IR}$ is a value associated with the soft buffer size per input bit sequence $a_k$, and is expressed in the number of bits. The $N_{IR}$ may be given by following Equation 4.

$$N_{IR} = \left\lfloor \frac{N_{soft}}{K_C \cdot K_{MIMO} \cdot \min(M_{DL\_HARQ}, M_{limit})} \right\rfloor \qquad \text{Equation 4}$$

Figure 13:
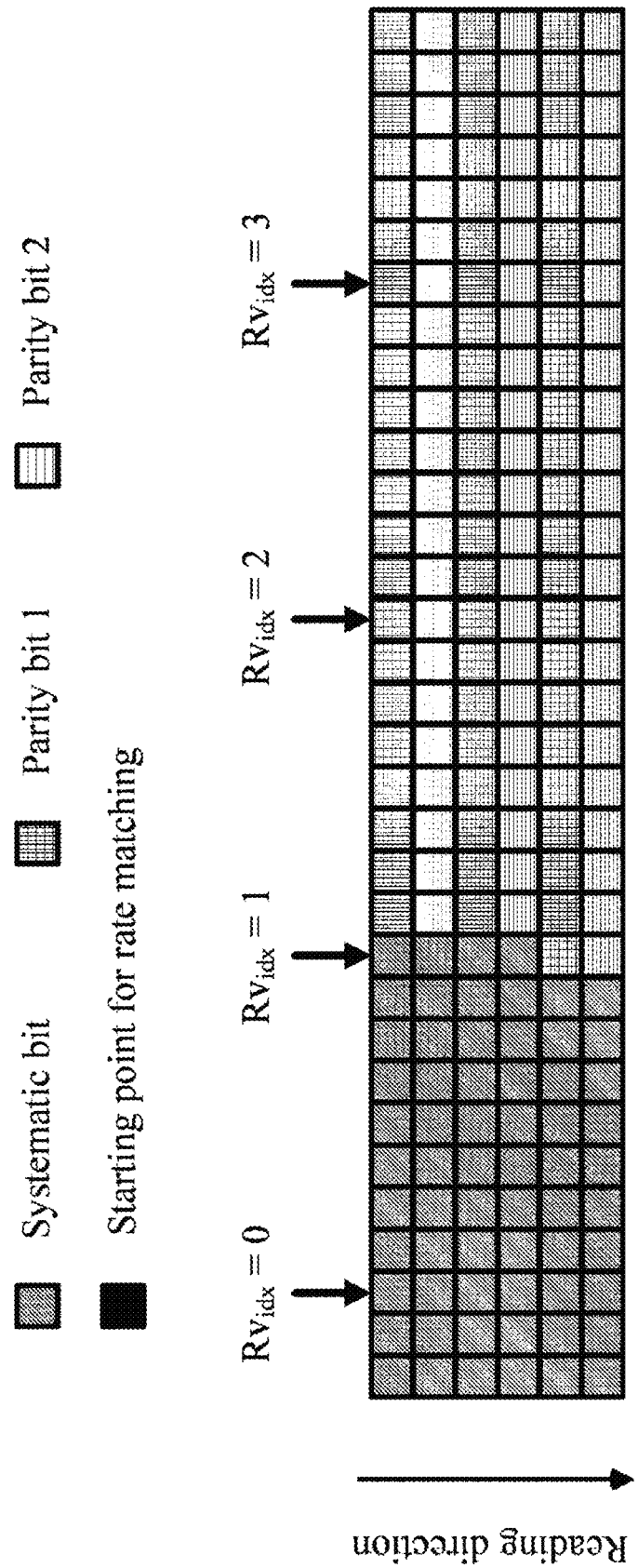
FIG. 13 is a schematic diagram illustrating an example of an operation in which a bit sequence mapped to a physical channel is provided based on RV numbers according to an aspect of the present embodiment.

FIG. 13 is a schematic diagram illustrating an example of an operation in which a bit sequence mapped to a physical channel is given, based on the RV number according to an aspect of the present embodiment. In FIG. 13, blocks represented by diagonal lines are the regions to which the systematic bits $d_k^{(0)}$ are mapped. In FIG. 13, blocks represented by lattice lines are regions to which the parity bits $d_k^{(1)}$ are mapped. In FIG. 13, blocks represented by horizontal lines are regions to which the parity bits $d_k^{(2)}$ are mapped. The region including the systematic bits and the parity bits as illustrated in FIG. 13 is the virtual cyclic buffer. In FIG. 13, the virtual circular buffer is read in a vertical direction.

The rate matching sequence $e_k$ may be provided, based at least on the virtual circular buffer $w_k$ and the RV number. A starting position of the rate matching sequence $e_k$ may be provided, based at least on the RV number.

$K_{MIMO}$ may be the same as the maximum number of transport blocks that can be included in one shared channel transmission received based on a transmission mode for which the terminal apparatus 1 is configured. The $K_{MIMO}$ may be associated with the maximum number of transport blocks that can be received during a prescribed period of time in a prescribed transmission method.

Here, $M_{DL\_HARQ}$ may be the maximum number of downlink HARQ processes. The $M_{DL\_HARQ}$ may be the maximum number of downlink HARQ processes managed in parallel in a corresponding one serving cell. The $M_{DL\_HARQ}$ may be provided, based at least on the higher layer signaling. For an FDD serving cell, $M_{DL\_HARQ}$ may be 8. For a TDD serving cell, $M_{DL\_HARQ}$ may correspond to an uplink/downlink configuration (UL/DL configuration). Here, $M_{limit}$ is 8. The uplink/downlink configuration is used in TDD to indicate mapping of a downlink subframe and an uplink subframe in a radio frame.

Here, $K_c$ may be any one of $\{1, 3/2, 2, 5/3, 3, \text{and } 5\}$ or may be any other value.

Here, $N_{soft}$ may be a total number of soft channel bits depending on a UE category or a downlink UE category. Here, the soft channel bits are also referred to as soft bits. The soft bits may be information provided, based on a Log Likelihood Ratio (LLR), or the like for the bits calculated after error correction decoding. For example, the amount of soft bits may be given, based at least on the LLR. The soft bits may have a value associated with the LLR.

The rate matching sequence $e_k$ corresponding to the r-th code block generated by the bit selection and pruning unit 4005 is also referred to as a rate matching sequence $e_{rk}$. The $N_{CB}$ rate matching sequences $e_{rk}$ may be concatenated together to generate a coded output sequence $f_{k,n}$. $f_{k,n}$ corresponding to multiple CBGs may be concatenated together to generate a coded output sequence $f_k$.

The coded output sequence $f_{k,n}$ may be sorted, based on the first reference, to provide a sorted coded output sequence $f_{k,n}$. The coded output sequences $f_{k,n}$ corresponding to multiple CBGs may be concatenated together to generate a coded output sequence $f_k$.

The $N_{CB\_per\_CBG}$ rate matching sequences $e_{rk}$ may be concatenated together to generate a coded output sequence $f_k$.

Second sorting may be applied to the coded output sequence $f_k$. The second sorting may include at least the following procedure.

(a) An input sequence is mapped in the first axis direction.
(b) The sequence mapped in the first axis direction is mapped in a second axis direction.

A sequence input in the second sorting may be a sequence provided, based at least on one or both of a modulation order of the modulation scheme corresponding to the transport block and the number of transmission layers of the transport block. The number of elements (coding modulation symbols) of the sequence input in the second sorting may be given by the product of the modulation order of the modulation scheme corresponding to the transport block and the transmission layer number of the transport block. The coded modulation symbol is a group including a part of the coded output sequence $f_k$. One modulation symbol is generated by modulating each group including a part of the coded output sequence $f_k$. In a case that one transport block is mapped to one layer, one coding modulation symbol may include coded output sequences $f_k$ identical in number to modulation orders of the modulation scheme corresponding to the transport block. In a case that one transport block is mapped to two layers, one coding modulation symbol may include coded output sequences $f_k$ of which number is the same as a value obtained by multiplying, by 2, the number of modulation orders $Q_m$ of the modulation scheme for each transport block.

A sequence output in the second sorting is also referred to as an output sequence $h_k$. In a case that the second sorting is not applied to the coded output sequence $f_k$, the output sequence $h_k$ may include coded output sequences $f_k$.

Hereinafter, operations of the resource element map processing unit 3007 will be described in detail.

The resource element map processing unit 3007 maps the transmission symbols to the resource elements. In the resource element map processing unit 3007, the first map processing or the second map processing may be applied to the transmission symbols. The first map processing may correspond to mapping the transmission symbols in the first axis direction. The second map processing may correspond to mapping the transmission symbols in the second axis direction.

The first axis may correspond to a frequency axis (subcarrier index). The second axis may correspond to a time axis (OFDM symbol index). In other words, the first map processing is also referred to as Frequency first mapping. The second map processing is also referred to as Time first mapping.

The first map processing and/or the second map processing may further include second permutation processing. The second permutation processing may be sorting in the column direction. The second permutation processing may be sorting in the frequency direction. The second permutation processing may be sorting in the time direction.

A HARQ procedure for the MAC layer will be described below. As an example of the HARQ procedure for the MAC layer, a case of downlink transmission will be described by way of example, but a part or all of the HARQ procedure for the MAC layer may be applied to the downlink transmission.

A MAC entity may be defined for at least one HARQ entity. The MAC entity may be an entity that manages one or more HARQ entities. The MAC entity may be the entity that manages processing of the MAC layer. The HARQ entity is the entity that manages one or more HARQ processes. Each HARQ process may be associated with the HARQ process number. The HARQ process number may be an identifier for the HARQ process. The HARQ entity may output HARQ information to the HARQ process. For example, the HARQ entity may output HARQ information corresponding to a prescribed HARQ process number to an HARQ process associated with the prescribed HARQ process number. The HARQ information includes at least some or all of the NDI, TBS, HARQ process number, and RV.

In a case that the spatial multiplexing scheme is configured as the downlink transmission method, input of one or two transport blocks may be expected for each Transmission Time Interval (TTI). In a case that the spatial multiplexing scheme is not configured as the downlink transmission method, the input of one transport block may be expected for each TTI.

The TTI may be a unit to which the transport block is mapped. The TTI may be provided, based at least on the number of OFDM symbols included at least in the slot and/or the subframe. The TTI may be provided, based at least on subcarrier spacings applied to the downlink slot. The HARQ process may be configured for each TTI.

In a case that downlink allocation is indicated at least for a prescribed TTI, the MAC entity allocates, based on the HARQ information, the transport block delivered from the physical layer and the HARQ information associated with the transport block, to the HARQ process associated with the transport block.

For each TTI at which transmission associated with a prescribed HARQ process occurs, the HARQ entity delivers one or two transport blocks and HARQ information associated with the transport blocks.

For each set of the transport blocks delivered from the HARQ entity and the HARQ information associated with the transport blocks, the HARQ process assumes that the transmission of the transport blocks is an initial transmission in a case that at least condition 1 is satisfied.

Condition 1 is that the new data indicator has toggled compared to (changed from) the last transmission. The new data indicator may be included in the HARQ information. The last transmission may be a transmission corresponding to the transport block and/or a transmission of a second transport block. The second transport block may be a last transmitted transport block. The second transport block may be a transport block corresponding to soft bits stored (saved) in a soft buffer for the HARQ process associated with the transport block. The HARQ process number associated with the transport block and the HARQ process number associated with the second transport block may be associated with each other. The HARQ process number associated with the transport block may be identical to the HARQ process number associated with the second transport block.

In a case that condition 1 is at least unsatisfied and/or a prescribed condition is satisfied, the transmission of the transport block is assumed to be retransmission.

In a case that the transmission of the transport block is an initial transmission, the MAC entity may attempt to decode received data. The received data may be received data including the transport block. In a case that the transmission of the transport block is retransmission and the second transport block has not been successfully decoded, the MAC entity may combine the received data with the soft bits corresponding to the second transport block to generate a third transport block and attempt to decode the third transport block.

In a case that condition 2 is satisfied, the MAC entity may generate an ACK for the transport block. Condition 2 may be that at least one of condition 2A and condition 2B is satisfied. Condition 2A may be that decoding for the transport block attempted in the MAC entity has been successfully performed. Condition 2B may be that decoding for the transport block has been previously successfully completed.

In a case that condition 2 is not satisfied, the MAC entity may replace the data stored in the soft buffer with data that the MAC entity has attempted to decode. In the case that condition 2 is not satisfied, the MAC entity may replace the soft bits stored in the soft buffer with soft bits generated based on the decoding of the transport block. In the case that condition 2 is not satisfied, a NACK may be generated for the transport block.

Replacing data stored in the soft buffer with data that the MAC entity has attempted to decode corresponds to flushing of the data stored in the soft buffer (causing the data to flow). Replacing the soft bits stored in the soft buffer with soft bits generated based on the decoding of the transport block corresponds to flushing of the data stored in the soft buffer.

In the MAC entity, flushing of the soft buffer may correspond to flushing of soft bits for all the bits in the transport block included in the soft buffer.

The HARQ procedure for the downlink of the physical layer will be described below.

In a case that operation 1 is performed in the transmission process 3000, information indicating a method for processing soft bits may be included in the downlink control information. Based on the reception of the downlink control information, the terminal apparatus 1 may switch the method for processing stored soft bits corresponding to the CBG.

The downlink control information used to schedule the PDSCH and/or PUSCH for the transport block may include information indicating the RV number for the transport block. The information indicating the RV number may be the RV number used for the transport block.

The downlink control information used to schedule the PDSCH and/or PUSCH for the transport block need not include information indicating the RV number for each of the one or more CBGs included in the transport block.

In the case that operation 1 is performed in the transmission process 3000, the configuration of the RV number may be provided for each CBG. In the case that operation 1 is performed in the transmission process 3000, the RV number used for a prescribed CBG may be different from the RV number for the transport block. The prescribed CBG may be included in the transport block. The RV number for the transport block may be indicated by the downlink control information used to schedule the PDSCH and/or PUSCH for the transport block. The RV number for the transport block may be included in an RV field in the downlink control information. The RV number for the transport block may be an RV number delivered to the higher layer (MAC entity). The RV number for the transport block may be an RV number managed by the MAC layer. The prescribed CBG may be a CBG for which transmission is indicated by the information indicating CBG transmission. The information indicating CBG transmission may be included in the downlink control information. The prescribed CBG may be a CBG for which flushing of the soft buffer is indicated by the information indicating the method for processing soft bits. The prescribed CBG may be a CBG for which non-use of the soft bits corresponding to the prescribed CBG in decoding of the prescribed CBG is indicated by the information indicating the method for processing soft bits. The prescribed CBG may be CBG indicating that the received data of the prescribed CBG and stored soft bits corresponding to the prescribed CBG are not combined by information indicating a method for processing soft bits. Information indicating a method for processing soft bits may be included in the downlink control information.

The RV number for the prescribed CBG may be a prescribed RV number. The prescribed RV number may be an RV number configured for the initial transmission of the transport block. The prescribed RV number may be a value configured in advance. The prescribed RV number may be 0=0). The prescribed RV number may be provided, based at least on the higher layer signaling. The RV number for a CBG other than the prescribed CBG may be provided, based on the RV number for the transport block. The RV number for a CBG other than the prescribed CBG may be the RV number for the transport block.

The RV number for the following CBG may be the RV number for the transport block; the transmission of the CBG is indicated by the information indicating CBG transmission, and flushing of the soft bits corresponding to the CBG is not indicated by the information indicating the method for processing soft bits.

In a case that operation 2 is performed in the transmission process 3000, the RV numbers of all the code blocks included in the transport block may be provided, based at least on the RV number for the transport block. In the case that operation 2 is performed in the transmission process 3000, all the code blocks included in the transport block may be configured to have the same RV number.

In the case that operation 1 is performed in the transmission process 3000, the downlink control information used to schedule the PDSCH and/or PUSCH for the transport block may include information used to configure RV numbers for the respective CBGs included in the transport block.

Based at least on the information used to configure the RV numbers for the respective CBGs, whether flushing of soft bits corresponding to the CBGs is indicated or not may be provided.

In the case that operation 2 is performed in the transmission process 3000, the downlink control information used to schedule the PDSCH and/or PUSCH for the transport block may include information used to configure the RV number for the transport block.

An example of a method for generating a channel in the transmission process 3000 according to an aspect of the present invention will be described below.

An operation applied to the transmission process 3000 may be provided, based at least on a prescribed condition 11. The operations applied to the transmission process 3000 may include at least operation 1 and operation 2. Whether operation 1 or operation 2 is to be applied to the transmission process 3000 may be provided, based at least on the prescribed condition 11.

In the transmission process 3000, switching may be performed between operation 1 and operation 2 based at least on the prescribed condition 11. For example, in the transmission process 3000, operation 1 may be applied in a case that the prescribed condition 11 is at least satisfied. In the transmission process 3000, operation 2 may be applied in a case that at least the prescribed condition 11 is not satisfied.

The prescribed condition 11 may include a condition that a signal waveform used to transmit a channel is a first signal waveform. For example, operation 1 may be applied in the transmission process 3000 in a case that the signal waveform used to transmit the channel is the first signal waveform. Operation 2 may also be applied in the transmission process 3000 in a case that the signal waveform used for channel transmission is a second signal waveform. The first signal waveform may be OFDM. The second signal waveform may be DFT-s-OFDM.

Whether the signal waveform used for channel transmission is the first signal waveform or the second signal waveform may be provided, based at least on a part or all of the MIB, the first system information, the second system information, the common RRC signaling, the dedicated RRC signaling, and the downlink control information.

The prescribed condition 11 may include a condition that transmission precode processing is performed on the modulation symbols in channel transmission. For example, operation 1 may be applied in the transmission process 3000 in a case that the transmission precode processing is not performed on the modulation symbols in channel transmission. Operation 2 may be applied in the transmission process 3000 in a case that the transmission precode processing is not performed on the modulation symbols in channel transmission.

Whether or not transmission precode processing is performed on the modulation symbols in channel transmission may be given based on at least some or all of the MIB, the first system information, the second system information, the common RRC signaling, the dedicated RRC signaling, and the downlink control information.

The prescribed condition 11 may include the second sorting being applied to the coded output sequence $f_k$ in channel transmission. For example, operation 1 may be applied in the transmission process 3000 in a case that the second sorting is applied to the coded output sequence $f_k$ in channel transmission. Operation 2 may be applied in the transmission process 3000 in a case that the second sorting is not applied to the coded output sequence $f_k$ in channel transmission. Operation 2 may be applied in the transmission process 3000 in a case that the second sorting is applied to the coded output sequence $f_k$ in channel transmission. Operation 1 may be applied in the transmission process 3000 in a case that the second sorting is not applied to the coded output sequence $f_k$ in channel transmission.

Whether or not the second sorting is applied to the coded output sequence $f_k$ in channel transmission may be provided, based at least on some or all of the MIB, the first system information, the second system information, the common RRC signaling, the dedicated RRC signaling, and the downlink control information.

The prescribed condition 11 may include the first map processing being applied to the transmission symbols in channel transmission. For example, operation 1 may be applied in the transmission process 3000 in a case that the first map processing is applied to the transmission symbols in channel transmission. Operation 2 may be applied in the transmission process 3000 in a case that the second map processing is applied to the transmission symbols in channel transmission. Operation 2 may be applied in the transmission process 3000 in a case that the first map processing is applied to the transmission symbols in channel transmission. Operation 1 may be applied in the transmission process 3000 in a case that the second map processing is applied to the transmission symbols in channel transmission.

Whether the first map processing or the second map processing is applied to the transmission symbols in channel transmissions may be provided, based at least on some or all of the MIB, the first system information, the second system information, the common RRC signaling, the dedicated RRC signaling, and the downlink control information.

Operation 1 may include at least some or all of the following operations 1A-1I. (1A) segmenting the first sequence $b_k^0$ into first sequence groups, (1B) performing, on the first sequence $b_k^0$, sorting based on the first reference, (1C) performed sorting on each of the first sequence groups $b_k''$ based on the first reference, (1D) attaching a second CRC sequence to the first sequence group $b_k''$, (1E) performing, on the CBG, sorting based on the first reference, (1F) performing the second permutation processing on the transmission symbols, (1G) the information indicating CBG transmission and/or the information indicating the method for processing soft bits is included in the downlink control information used to schedule transmission of the PDSCH and/or the PUSCH, (1H) feeding back the HARQ-ACK generated for each CBG, and (1I) transmitting the downlink control information including the information indicating CBG transmission and/or the information indicating the method for processing soft bits.

In operation 1G, in a case of the initial transmission of the PDSCH and/or the PUSCH, information indicating CBG transmission may be reserved. In the case of the initial transmission of the PDSCH and/or the PUSCH, the information indicating the method for processing soft bits may be reserved. The downlink control information in operation 1G may be transmitted in a format of the first downlink control information (first DCI format).

Operation 1H may be that, in a case that transmission of a transport block that corresponds to a prescribed HARQ process number and is included in the PDSCH and/or PUSCH scheduled by the downlink control information is a retransmission of the transport block that corresponds to the prescribed HARQ process number and is transmitted immediately before, the downlink control information includes an HARQ-ACK generated for each CBG.

Operation 1H may include a second HARQ-ACK in a first HARQ-ACK. The second HARQ-ACK may be an HARQ-ACK generated for each CBG. The second HARQ-ACK may be an HARQ-ACK for the CBG. Operation 1H may correspond to the first HARQ-ACK not including a third HARQ-ACK. The third HARQ-ACK may be an HARQ-ACK generated for each transport block. The third HARQ-ACK may be an HARQ-ACK for the transport block.

Operation 2 may correspond to omitting performance of some or all of the operations included in operation 1. In other words, operation 2 may include at least some or all of the following operations 2A to 2I.

(2A) not segmenting the first sequence $b_k^0$ into first sequence groups, (2B) not performing, on the first sequence $b_k^0$, sorting based on the first reference, (2C) not performing, on each first sequence group $b_k''$, the sorting based on the first reference, (2D) not attaching the second CRC sequence to the first sequence group $b_k''$, (2E) not performing, on the CBG, the sorting based on the first reference, (2F) not performing the second permutation processing on the transmission symbols, (2G) performing scheduling by including the information indicating CBG transmission and/or the information indicating the method for processing soft bits, in the downlink control information used to schedule the transmission of the PDSCH and/or the PUSCH, (2H) not feeding back the HARQ-ACK generated for each CBG, and (2I) transmitting the downlink control information without the information indicating CBG transmission and/or the information indicating the method for processing soft bits (or inputting, into the downlink control information, a bit sequence configured in advance for the information indicating CBG transmission and/or the information indicating the method for processing soft bits).

The downlink control information in operation 2G may be transmitted in a format of second downlink control information (second DCI format).

Operation 2H may be that, in a case that transmission of a transport block that corresponds to a prescribed HARQ process number and is included in the PDSCH and/or PUSCH scheduled by the downlink control information is a retransmission of the transport block that corresponds to the prescribed HARQ process number and is transmitted immediately before, the downlink control information does not include an HARQ-ACK generated for each CBG.

Operation 2H may correspond to including no second HARQ-ACK in the first HARQ-ACK. Operation 2H may correspond to including third HARQ-ACK feedback in the first HARQ-ACK.

Whether the operation applied in the transmission process 3000 is operation 1 or operation 2 may be provided, based at least on the prescribed condition 11 and the first configuration information. The first configuration information may be included in higher layer signaling and/or downlink control information. For example, in a case that the prescribed condition 11 is satisfied, whether operation 1 or operation 2 is applied in the transmission process 3000 may be provided, based on the first configuration information. In a case that the prescribed condition 11 is satisfied, operation 2 may be applied in the transmission process 3000 without being based on the first configuration information.

The first configuration information may include the number of CBGs $N_{CBG}$ included in the transport block. In a case that the prescribed condition 11 is satisfied, whether operation 1 or operation 2 is applied in transmission process 3000 may be given based at least on the value of the $N_{CBG}$. For example, in the case that the prescribed condition 11 is satisfied, operation 1 may be applied to the transmission process 3000 in a case that the $N_{CBG}$ has a value greater than 1. In the case that the prescribed condition 11 is satisfied, operation 2 may be applied to the transmission process 3000 in a case that the $N_{CBG}$ is 1.

The first configuration information may include a maximum number $N_{CBG\_max}$ of CBGs included in the transport block. In the case that the prescribed condition 11 is satisfied, whether operation 1 or operation 2 is applied in transmission process 3000 may be provided, based at least on the value of the $N_{CBG\_max}$. For example, in a case that the prescribed condition 11 is satisfied, operation 1 may be applied to the transmission process 3000 in a case that the $N_{CBG\_max}$ is a value greater than 1 and that the $N_{CBG}$ is a value greater than 1, and otherwise operation 1 may be applied to transmission process 3000. In other words, the first configuration information may include at least the $N_{CBG\_max}$ and the $N_{CBG}$.

Whether operation 1 or operation 2 is applied in transmission process 3000 may be provided, based at least on the first configuration information. For example, operation 1 may be applied to the transmission process 3000 in a case that the $N_{CBG}$ is a value greater than 1. Operation 2 may be applied to the transmission process 3000 in a case that $N_{CBG}$ is 1.

For example, operation 1 may be applied to the transmission process 3000 in a case that the $N_{CBG\_max}$ is a value greater than 1 and that the $N_{CBG}$ is a value greater than 1. Operation 2 may be applied to the transmission process 3000 in a case that the $N_{CBG\_max}$ is 1 and/or that the $N_{CBG}$ is 1.

Operation 2 may include at least some or all of the operations 1A to 1F. Whether or not operation 2 is applied based on the prescribed condition 11 may be provided, based at least on the higher layer signaling and/or the second configuration information included in the downlink control information. For example, in a case that the second configuration information is used to trigger application of operation 2, whether or not operation 2 is applied based on the prescribed condition 11 may be provided. In a case that the second configuration information is used to trigger non-application of operation 2, the second operation need not be applied regardless of the prescribed condition 11.

Capability information indicating whether or not part of or all of operation 1 is supported in the terminal apparatus 1 may be transmitted by the terminal apparatus 1 using the higher layer signaling. The capability information indicating whether or not part of or all of operation 1 is supported in the terminal apparatus 1 may be provided for each signal waveform. For example, the capability information for OFDM and the capability information for DFT-s-OFDM may be transmitted by the terminal apparatus 1.

Application of operation 1 may allow the second CRC sequence to be attached to the CBG. Application of operation 2 may eliminate the need to attach the second CRC sequence to the CBG. In a case that the first HARQ-ACK is configured to include the second HARQ-ACK, the second CRC sequence may be attached to CBG. In a case that the first HARQ-ACK is configured to include the third CRC, the second CRC sequence need not be attached to the CBG. In a case that the first HARQ-ACK is not configured to include the third HARQ-ACK, then the second CRC sequence need not be attached to the CBG. In a case that the first HARQ-ACK is not configured to include the third CRC, the second CRC sequence need not be attached to the CBG.

A method for receiving a channel included in the terminal apparatus 1 and/or the base station apparatus 3 will be described below.

In channel reception, the terminal apparatus 1 and/or the base station apparatus 3 performs demodulation processing and decoding processing, based on the generation of the channel based on the transmission process 3000. Whether the transport block has been successfully decoded or not may be provided, based at least on the first CRC sequence included in the decoded transport block. The HARQ-ACK for the transport block may be provided, based on whether the transport block has been successfully decoded or not.

In a case that the transport block has been successfully decoded, the terminal apparatus 1 may generate an ACK for the transport block. In a case that the CBG has not been successfully decoded, the terminal apparatus 1 may generate a NACK for the transport block. Successful decoding of the transport block may mean that all code blocks of the transport block have been successfully decoded.

In channel reception, whether or not the CBG has been successfully decoded may be provided, based at least on the second CRC sequence. In channel reception, whether or not the CBG has been successfully decoded may be provided, based at least on the third CRC sequence. For example, whether the CBG has been successfully decoded may be provided, based on the third CRC sequence attached to all the code blocks included in the CBG. The HARQ-ACK for the CBG may be provided, based on whether the CBG has been successfully decoded.

In a case that the CBG has been successfully decoded, the terminal apparatus 1 may generate an ACK for the CBG. In a case that the CBG has not been successfully decoded, the terminal apparatus 1 may generate a NACK for the CBG. Successful decoding of the CBG may mean that all code blocks of the CBG have been successfully decoded.

A configuration for a method for feeding back the HARQ-ACK may be switched between a case that operation 1 is performed in the transmission process 3000 and a case that operation 2 is performed in the transmission process 3000. In the case that operation 1 is performed in the transmission process 3000, a first PUCCH configuration may be provided as a PUCCH configuration for HARQ-ACK feedback. In the case that operation 2 is performed in the transmission process 3000, a second PUCCH configuration may be provided as a PUCCH configuration for HARQ-ACK feedback.

The PUCCH configuration may include some or all of a PUCCH format, the number of OFDM symbols used for PUCCH transmission, a transmission method applied to the PUCCH, a coding method applied to the uplink control information transmitted in the PUCCH, and a radio resource configuration.

In the first PUCCH configuration, the PUCCH format may be a first PUCCH format. For example, the first PUCCH format may be a PUCCH format used for transmission of uplink control information of at least $Z_1$ bits or less. $Z_1$ may be 1, 2, or any other value. In the second PUCCH configuration, the PUCCH format may be a second PUCCH format. The second PUCCH format may be a PUCCH format used for transmission of uplink control information of at least $Z_2$ bits or more. $Z_2$ may be 2, 3, or any other value.

In the first PUCCH configuration, the number of OFDM symbols used for PUCCH transmission may be a first number of OFDM symbols. The first number of OFDM symbols may be 1, 2, or any other value. In the second PUCCH configuration, the number of OFDM symbols used for PUCCH transmission may be a second number of OFDM symbols. The second number of OFDM symbols may be 7, 14, or any other value.

In the first PUCCH configuration, Sequence selection may be configured for a transmission method applied to the PUCCH. The sequence selection may be a transmission method in which the uplink control information is notified, based on a transmitted sequence. For example, the uplink control information may be notified, based on a cyclic shift amount of the transmitted sequence. In the first PUCCH configuration, DFT spreading need not be used for the transmission method applied to the PUCCH. In the second PUCCH configuration, OFDM may be used for the transmission method applied to the PUCCH. In the second PUCCH configuration, DFT spreading may be used for the transmission method applied to the PUCCH.

In the first PUCCH configuration, a first coding scheme applied to the uplink control information included in the PUCCH for transmission may include repetition codes. The first coding scheme may include Reed-Muller codes. In the second PUCCH configuration, the second coding scheme applied to the uplink control information included in the PUCCH for transmission may include the Reed-Muller codes. The second coding scheme may include convolutional codes. The second coding scheme may include polar codes.

For example, a first PUCCH format may be used to transmit the HARQ-ACK for the PDSCH based on the downlink control information used to schedule the PDSCH and/or PUSCH for the initial transmission of the transport block. A second PUCCH format may be used to transmit the HARQ-ACK for PDSCH based on downlink control information including the information indicating CBG transmission. The first PUCCH format may be used to transmit the HARQ-ACK for the PDSCH based on the downlink control information not including the information indicating CBG transmission.

In a case that the second PUCCH format is not configured, retransmission of the PDSCH based on the CBG need not be applied. In other words, the configuration of the second PUCCH format may allow retransmission of the PDSCH based on the CBG to be applied. In a case that the second PUCCH format is not configured, operation 2 may be applied in the transmission process 3000 regardless of the prescribed condition 11. In a case that the second PUCCH format is configured, whether operation 1 or operation 2 is applied in transmission process 3000 may be provided, based at least on a prescribed condition.

In a case that the second PUCCH format is not configured, the HARQ-ACK for the PDSCH based on the CBG may be transmitted using the PUSCH.

In a case that the second PUCCH format is not configured, the HARQ-ACK for the PDSCH based on the CBG may be transmitted by aggregated multiple first PUCCH formats. In such a case, the use of the aggregated first PUCCH format may be configured.

In a case that all of multiple CBGs for one transport block are ACKs or NACKs, the corresponding HARQ-ACK may be transmitted by using the first PUCCH format. In other words, in the case that all of multiple CBGs for one transport block are ACKs or NACKs, one HARQ-ACK bit may be used for transmission.

An apparatus configuration of the terminal apparatus 1 according to the present invention will be described below.

Figure 15:
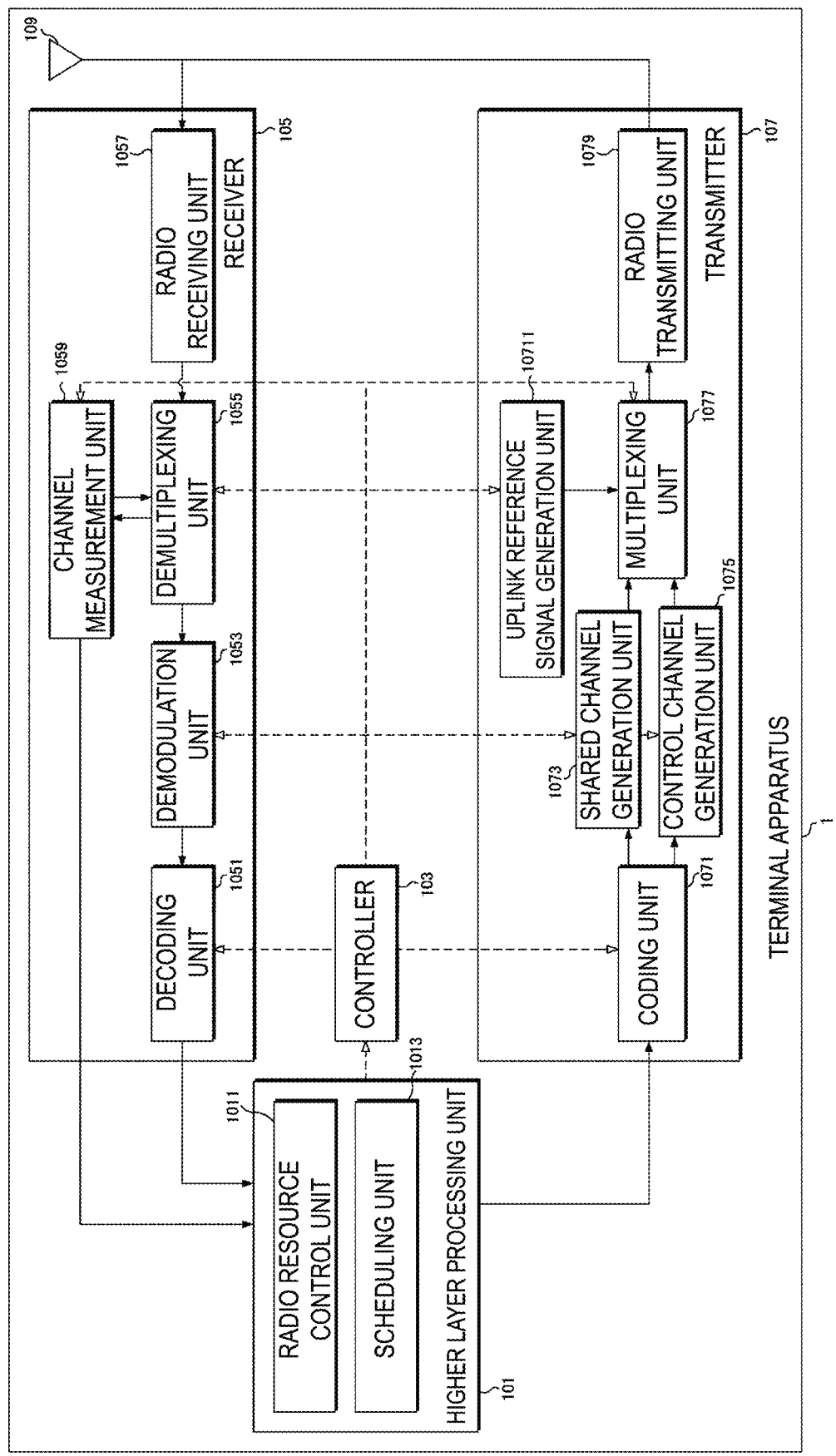
FIG. 15 is a schematic block diagram illustrating a configuration of a terminal apparatus 1 according to the present embodiment.

FIG. 15 is a schematic block diagram illustrating a configuration of the terminal apparatus 1 according to the present embodiment. As illustrated, the terminal apparatus 1 includes at least one of a higher layer processing unit 101, a controller 103, a receiver 105, a transmitter 107, and a transmit and receive antenna 109. The higher layer processing unit 101 includes at least one of a radio resource control unit 1011 and a scheduling unit 1013. The receiver 105 includes at least one of a decoding unit 1051, a demodulation unit 1053, a demultiplexing unit 1055, a radio receiving unit 1057, and a channel measurement unit 1059. The transmitter 107 includes at least one of a coding unit 1071, a shared channel generation unit 1073, a control channel generation unit 1075, a multiplexing unit 1077, a radio transmitting unit 1079, and an uplink reference signal generation unit 10711.

The higher layer processing unit 101 outputs, to the transmitter 107, the uplink data generated by a user operation or the like. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer. The higher layer processing unit 101 generates control information for control of the receiver 105 and the transmitter 107, based on, for example, the downlink control information received on the control channel, and outputs the generated control information to the controller 103.

The radio resource control unit 1011 included in the higher layer processing unit 101 manages various configuration information of the terminal apparatus 1. For example, the radio resource control unit 1011 manages the configured serving cell. The radio resource control unit 1011 generates information to be mapped to each uplink channel, and outputs the generated information to the transmitter 107. In a case of successfully decoding the received downlink data, the radio resource control unit 1011 generates an ACK, outputs the ACK to the transmitter 107. In a case of failing to decode the received downlink data, the radio resource control unit 1011 generates a NACK and outputs the NACK to the transmitter 107.

The scheduling unit 1013 included in the higher layer processing unit 101 stores downlink control information received via the receiver 105. The scheduling unit 1013 controls the transmitter 107 via the controller 103 so as to transmit the PUSCH in accordance with the received uplink grant in a subframe four subframes after the subframe in which the uplink grant has been received. The scheduling unit 1013 controls the receiver 105 via the controller 103 so as to receive the shared channel in accordance with the downlink grant received in the subframe in which the downlink grant has been received.

Based on the control information from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107.

In accordance with the control signal input from the controller 103, the receiver 105 demultiplexes, demodulates, and decodes a reception signal received from the base station apparatus 3 through the transmit and receive antenna 109, and outputs the decoded information to the higher layer processing unit 101.

The radio receiving unit 1057 orthogonally demodulates the downlink signal received via the transmit and receive antenna 109, and converts the orthogonally-demodulated analog signal to a digital signal. For example, the radio receiving unit 1057 may perform Fast Fourier Transform (FFT) on the digital signal, and extract a signal in the frequency domain.

The demultiplexing unit 1055 demultiplexes the extracted signal into a control channel, a shared channel, and a reference signal channel. The demultiplexing unit 1055 outputs the reference signal channel resulting from the demultiplexing, to the channel measurement unit 1059.

The demodulation unit 1053 demodulates the control channel and the shared channel with respect to a modulation scheme such as QPSK, 16 Quadrature Amplitude Modulation (QAM), 64QAM, and the like, and outputs the demodulated channels to the decoding unit 1051.

The decoding unit 1051 decodes the downlink data and outputs the decoded downlink data to the higher layer processing unit 101. The channel measurement unit 1059 calculates a downlink channel estimate from the reference signal channel and outputs the calculated downlink channel estimate to the demultiplexing unit 1055. The channel measurement unit 1059 calculates channel state information, and outputs the channel state information to the higher layer processing unit 101.

The transmitter 107 generates an uplink reference signal channel in accordance with the control signal input from the controller 103, codes and modulates uplink data and uplink control information input from the higher layer processing unit 101, multiplexes the shared channel, the control channel, and the reference signal channel, and transmits a signal resulting from the multiplexing to the base station apparatus 3 through the transmit and receive antenna 109.

The coding unit 1071 codes the uplink control information and the uplink data input from the higher layer processing unit 101, and outputs coded bits to shared channel generation unit 1073 and/or the control channel generation unit 1075.

The shared channel generation unit 1073 may modulate the coded bits input from the coding unit 1071 to generate modulation symbols, performs DFT on the modulation symbols to generate a shared channel, and output the shared channel to the multiplexing unit 1077. The shared channel generation unit 1073 may modulate the coded bits input from the coding unit 1071 to generate a shared channel and output the generated shared channel to the multiplexing unit 1077.

The control channel generation unit 1075 generates a control channel based on the coded bits input from the coding unit 1071, and/or an SR, and outputs the generated control channel to the multiplexing unit 1077.

The uplink reference signal generation unit 10711 generates an uplink reference signal, and outputs the generated uplink reference signal to the multiplexing unit 1077.

In accordance with a control signal input from the controller 103, the multiplexing unit 1077 multiplexes a signal input from the shared channel generation unit 1073 and/or a signal input from the control channel generation unit 1075, and/or an uplink reference signal input from the uplink reference signal generation unit 10711, on uplink resource elements for each transmit antenna port.

The radio transmitting unit 1079 performs Inverse Fast Fourier Transform (IFFT) on a multiplexed signal to generate a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and receive antenna 109 for transmission.

An apparatus configuration of the base station apparatus 3 of the present invention will be described below.

Figure 16:
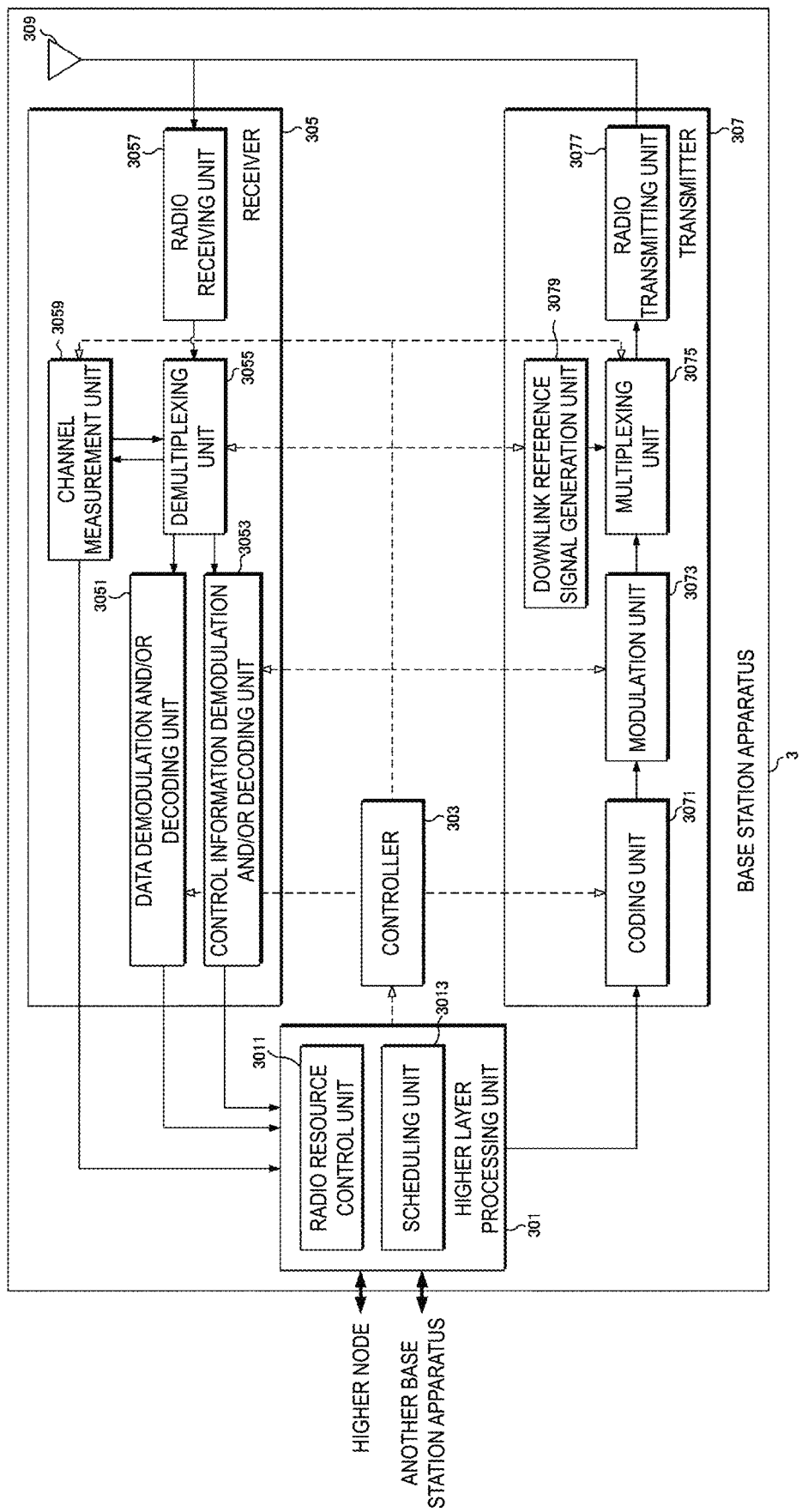
FIG. 16 is a schematic block diagram illustrating a configuration of a base station apparatus 3 according to the present embodiment.

FIG. 16 is a schematic block diagram illustrating a configuration of the base station apparatus 3 according to the present embodiment. As is illustrated, the base station apparatus 3 includes a higher layer processing unit 301, a controller 303, a receiver 305, a transmitter 307, and a transmit and receive antenna 309. The higher layer processing unit 301 includes a radio resource control unit 3011 and a scheduling unit 3013. The receiver 305 includes a data demodulation and/or decoding unit 3051, a control information demodulation and/or decoding unit 3053, a demultiplexing unit 3055, a radio receiving unit 3057, and a channel measurement unit 3059. The transmitter 307 includes a coding unit 3071, a modulation unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. The higher layer processing unit 301 generates control information for control of the receiver 305 and the transmitter 307, and outputs the generated control information to the controller 303.

The radio resource control unit 3011 included in the higher layer processing unit 301 generates, or acquires from a higher node, downlink data, RRC signaling, and a MAC Control Element (CE) to be mapped to the downlink shared channel, and outputs the data resulting from the generation or the acquirement to the HARQ control unit 3013. The radio resource control unit 3011 manages various configuration information for each of the terminal apparatuses 1. For example, the radio resource control unit 3011 performs, for example, management of the serving cell configured for the terminal apparatus 1.

The scheduling unit 3013 included in the higher layer processing unit 301 manages radio resources for the shared channel and control channel to be allocated to the terminal apparatus 1. In a case of allocating radio resources for the shared channel to the terminal apparatus 1, the scheduling unit 3013 generates an uplink grant indicating the allocation of the radio resources for the shared channel, and outputs the generated uplink grant to the transmitter 307.

Based on the control information from the higher layer processing unit 301, the controller 303 generates a control signal for control of the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes the reception signal received from the terminal apparatus 1 through the transmit and receive antenna 309, and outputs information resulting from the decoding to the higher layer processing unit 301.

The radio receiving unit 3057 orthogonally demodulates the uplink signal received via the transmit and receive antenna 309, and converts the orthogonally-demodulated analog signal to a digital signal. The radio receiving unit 3057 performs Fast Fourier Transform (FFT) on the digital signal, extracts a signal in the frequency domain, and outputs the resulting signal to the demultiplexing unit 3055.

The demultiplexing unit 1055 demultiplexes the signal input from the radio receiving unit 3057 into signals such as a control channel, shared channel, and a reference signal channel. Note that the demultiplexing is performed based on radio resource allocation information that is determined in advance by the base station apparatus 3 using the radio resource control unit 3011 and that is included in the uplink grant notified to each of the terminal apparatuses 1. The demultiplexing unit 3055 compensates for the control channel and the shared channel, based on the channel estimate input from the channel measurement unit 3059. The demultiplexing unit 3055 outputs, to the channel measurement unit 3059, a reference signal channel resulting from the demultiplexing.

The demultiplexing unit 3055 acquires modulation symbols of the uplink data and modulation symbols of the uplink control information (HARQ-ACK) from the control channel and the shared channel resulting from the demultiplexing. The demultiplexing unit 3055 outputs, to the data demodulation and/or decoding unit 3051, the modulation symbols of the uplink data acquired from the shared channel signal. The demultiplexing unit 3055 outputs, to the control information demodulation and/or decoding unit 3053, the modulation symbols of the uplink control information (HARQ-ACK) acquired from the control channel or the shared channel.

The channel measurement unit 3059 measures the channel estimate, the channel quality, and the like, based on the uplink reference signal input from the demultiplexing unit 3055, and outputs a result of the measurement to the demultiplexing unit 3055 and the higher layer processing unit 301.

The data demodulation and/or decoding unit 3051 decodes the uplink data from the modulation symbols of the uplink data input from the demultiplexing unit 3055. The data demodulation and/or decoding unit 3051 outputs the decoded uplink data to the higher layer processing unit 301.

The control information demodulation and/or decoding unit 3053 decodes the HARQ-ACK from the modulation symbols of the HARQ-ACK input from the demultiplexing unit 3055. The control information demodulation and/or decoding unit 3053 outputs the decoded HARQ-ACK to the higher layer processing unit 301.

In accordance with the control signal input from the controller 303, the transmitter 307 generates a downlink reference signal, codes and modulates the downlink control information and downlink data input from the higher layer processing unit 301, multiplexes the control channel, the shared channel, and the reference signal channel, and transmits a signal resulting from the multiplexing to the terminal apparatus 1 through the transmit and receive antenna 309.

The coding unit 3071 codes the downlink control information and downlink data input from the higher layer processing unit 301. The modulation unit 3073 modulates the coded bits input from the coding unit 3071, in compliance with the modulation scheme such as BPSK, QPSK, 16 QAM, and 64 QAM. The modulation unit 3073 may apply precoding to the modulation symbol. The precoding may include a transmission precode. Note that the precoding may be multiplication by (application of) a precoder.

The downlink reference signal generation unit 3079 generates a downlink reference signal. The multiplexing unit 3075 multiplexes the modulation symbols of each channel and the downlink reference signal to generate transmission symbols.

The multiplexing unit 3075 may apply precoding to the transmission symbols. The precoding applied to the transmission symbols by the multiplexing unit 3075 may be applied to the downlink reference signal and/or the modulation symbols. The precoding applied to the downlink reference signal and the precoding applied to the modulation symbols may be the same or different from each other.

The radio transmitting unit 3077 performs Inverse Fast Fourier Transform (IFFT) on the multiplexed transmission symbols and the like to generate time symbols. The radio transmitting unit 3077 performs OFDM modulation on the time symbols to generate a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, and removes unnecessary frequency components to generate a Carrier signal, an RF signal, or the like. The radio transmitting unit 3077 power-amplifies the carrier signal and outputs the amplified carrier signal to the transmit and receive antenna 309 for transmission.

(1) To accomplish the object described above, aspects of the present invention are contrived to provide the following measures. Specifically, a first aspect of the present invention is a terminal apparatus including a receiver configured to receive a transport block in a PDSCH scheduled by using downlink control information, and a decoding unit configured to decode a first code block group included in the transport block, the first code block group including one or more code blocks, and a sequence included in the one or more code blocks being provided, based at least on a redundancy version, and in a case that the downlink control information indicates flushing of a first soft bit corresponding to the first code block group, the redundancy version of the one or more code blocks being configured to a prescribed value, and in a case that the downlink control information does not indicate flushing of the first soft bit, the redundancy version of the one or more code blocks being indicated by the downlink control information.

(2) In the first aspect of the present invention, in a case that the downlink control information indicates flushing of a second soft bit corresponding to the transport block, the redundancy version of the one or more code blocks is indicated by the downlink control information.

(3) A second aspect of the present invention is a base station apparatus including a transmitter configured to schedule a PDSCH for a transport block by using downlink control information, and a coding unit configured to configure and code a first code block group included in the transport block, the first code block group including one or more code blocks, and a sequence included in the one or more code blocks being provided, based at least on a redundancy version, and in a case that the downlink control information indicates flushing of a first soft bit corresponding to the first code block group, the redundancy version of the one or more code blocks being configured to a prescribed value, and in a case that the downlink control information does not indicate flushing of the first soft bit, the redundancy version of the one or more code blocks being indicated by the downlink control information.

(4) In the second aspect of the present invention, in a case that the downlink control information indicates flushing of a second soft bit corresponding to the transport block, the redundancy version of the one or more code blocks is indicated by the downlink control information.

(5) A third aspect of the present invention is a terminal apparatus including a receiver configured to receive a transport block, a decoding unit configured to decode each of multiple CBs included in the transport block, and a transmitter configured to transmit an HARQ-ACK corresponding to each of multiple CBG, the multiple CBs including one or more first CBs and one or more second CBs, a first size of the first CB being greater than a second size of the second CB, each of the multiple CBs being included in any one of the multiple CBGs, the multiple CBGs including one or more first CBGs and one or more second CBGs, a first total number of the first CBs and the second CBs included in each of the one or more first CBGs being greater than a second total number of the first CBs and the second CBs included in each of the one or more second CBGs, and the CBG including a greatest number of second CBs being one of the one or more first CBGs.

(6) A fourth aspect of the present invention is a terminal apparatus including a receiver configured to receive a transport block, a decoding unit configured to decode each of multiple CBs included in the transport block, and a transmitter configured to transmit an HARQ-ACK corresponding to each of multiple CBGs, the multiple CBs including one or more first CBs and one or more second CBs, a first size of the first CB being greater than a second size of the second CB, each of the multiple CBs being included in any one of the multiple CBGs, the multiple CBGs including one or more first CBGs and one or more second CBGs, a first total number of the first CBs and the second CBs included in each of the one or more first CBGs being greater than a second total number of the first CBs and the second CBs included in each of the one or more second CBGs, and an average value of numbers of the second CBs included in the one or more second CBGs being greater than an average value of numbers of the second CBs included in the one or more first CBGs.

(7) A fifth aspect of the present invention is a terminal apparatus including: a receiver configured to receive a transport block, a decoding unit configured to decode each of multiple CBs included in the transport block, and a transmitter configured to transmit an HARQ-ACK corresponding to each of multiple CBGs, the multiple CBs including one or more first CBs and one or more second CBs, a first size of the first CB being greater than a second size of the second CB, each of the multiple CBs being included in any one of the multiple CBGs, the multiple CBGs including one or more first CBGs and one or more second CBGs, a sum of the first CBs and the second CBs included in the first CBG being greater than a sum of the first CB and the second CB included in the second CBG, indexes of the one or more first CBGs being smaller than indexes of the one or more second CBGs, indexes of the multiple CBs included in the one or more first CBGs being smaller than indexes of the multiple CBs included in the one or more second CBGs, and indexes of the one or more first CBs being greater than indexes of the one or more second CBs.

(8) A sixth aspect of the present invention is a base station apparatus including a coding unit configured to segment a transport block into multiple CBs and to code each of the multiple CBs, a transmitter configured to transmit the transport block, and a receiver configured to receive an HARQ-ACK corresponding to each of multiple CBG, the multiple CBs including one or more first CBs and one or more second CBs, a first size of the first CB being greater than a second size of the second CB, each of the multiple CBs being included in any one of the multiple CBGs, the multiple CBGs including one or more first CBGs and one or more second CBGs, a first total number of the first CBs and the second CBs included in each of the one or more first CBGs being greater than a second total number of the first CBs and the second CBs included in each of the one or more second CBGs, and the CBG including a greatest number of second CBs being one of the one or more first CBGs.

(9) A seventh aspect of the present invention is a base station apparatus including a coding unit configured to segment a transport block into multiple CBs and to code each of the multiple CBs, a transmitter configured to transmit the transport block, and a receiver configured to receive an HARQ-ACK corresponding to each of multiple CBGs, the multiple CBs including one or more first CBs and one or more second CBs, a first size of the first CB being greater than a second size of the second CB, each of the multiple CBs being included in any one of the multiple CBGs, the multiple CBGs including one or more first CBGs and one or more second CBGs, a first total number of the first CBs and the second CBs included in each of the one or more first CBGs being greater than a second total number of the first CBs and the second CBs included in each of the one or more second CBGs, and an average value of numbers of the second CBs included in the one or more second CBGs being greater than an average value of numbers of the second CBs included in the one or more first CBGs.

(10) An eighth aspect of the present invention is a base station apparatus including a coding unit configured to segment a transport block into multiple CBs and to code each of the multiple CBs, a transmitter configured to transmit the transport block, and a receiver configured to receive an HARQ-ACK corresponding to each of multiple CBG, the multiple CBs including one or more first CBs and one or more second CBs, a first size of the first CB being greater than a second size of the second CB, each of the multiple CBs being included in any one of the multiple CBGs, the multiple CBGs including one or more first CBGs and one or more second CBGs, a sum of the first CBs and the second CBs included in the first CBG being greater than a sum of the first CB and the second CB included in the second CBG, indexes of the one or more first CBGs being smaller than indexes of the one or more second CBGs, indexes of the multiple CBs included in the one or more first CBGs being smaller than indexes of the multiple CBs included in the one or more second CBGs, and indexes of the one or more first CBs being greater than indexes of the one or more second CBs.

A program running on the terminal apparatus 1 and the base station apparatus 3 according to the present invention may be a program controlling a Central Processing Unit (CPU) and the like (program causing a computer to function) in such a manner as to realize the functions of the above-described embodiment according to the present invention. The information handled in these apparatuses is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral device. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used for transmission of the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

The terminal apparatus 1 and the base station apparatus 3 according to the above-described embodiment may be achieved as an aggregation (apparatus group) including multiple apparatuses. Each of the apparatuses constituting such an apparatus group may include at least one of each function or each functional block of the terminal apparatus 1 and base station apparatus 3 according to the above-described embodiment. The apparatus group may include each general function or each functional block of the terminal apparatus 1 and the base station apparatus 3. Furthermore, the terminal apparatus 1 and the base station apparatus 3 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). The base station apparatus 3 according to the above-described embodiment may have at least one of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

CROSS-REFERENCE OF RELATED APPLICATION

This application relates to the application of Application No. 2017-115880, filed Jun. 13, 2017, which claims priority based on the above application. The contents of the above application are incorporated herein by reference.

REFERENCE SIGNS LIST 1 (1A, 1B, 1C) Terminal apparatus
3 Base station apparatus
101 Higher layer processing unit
103 Controller
105 Receiver
107 Transmitter
109 Transmit and receive antenna
1011 Radio resource control unit
1013 Scheduling unit
1051 Decoding unit
1053 Demodulation unit
1055 Demultiplexing unit
1057 Radio receiving unit
1059 Channel measurement unit
1071 Coding unit
1073 Shared channel generation unit
1075 Control channel generation unit
1077 Multiplexing unit
1079 Radio transmitting unit
10711 Uplink reference signal generation unit
301 Higher layer processing unit
303 Controller
305 Receiver
307 Transmitter
309 Transmit and receive antenna
3000 Transmission process
3001 Coding processing unit
3002 Scrambling processing unit
3003 Modulation map processing unit
3004 Layer map processing unit
3005 Transmission precode processing unit
3006 Precode processing unit
3007 Resource element map processing unit
3008 Baseband signal generation processing unit
3011 Radio resource control unit
3013 Scheduling unit
3051 Data demodulation and/or decoding unit
3053 Control information demodulation and/or decoding unit
3055 Demultiplexing unit
3057 Radio receiving unit
3059 Channel measurement unit
3071 Coding unit
3073 Modulation unit
3075 Multiplexing unit
3077 Radio transmitting unit
3079 Downlink reference signal generation unit
401 Segmentation and CRC attachment unit
4001 CRC attachment unit
4002 Coding unit
4003 Sub-block interleaver unit
4004 Bit collection unit
4005 Bit selection and pruning unit
4006 Concatenation unit
4011 Code block segmentation unit
4012 CRC attachment unit

The invention claimed is:

1. A terminal device comprising:
a receiver configured to:
receive a first Physical Downlink Shared Channel (PDSCH) scheduled by a first Downlink Control Information (DCI) format transmitted in a first Physical Downlink Control Channel (PDCCH) in a UE specific search space,
receive a second PDSCH scheduled by a second DCI format transmitted in a second PDCCH in a common search space, and
receive a first configuration including at least the maximum number of Code Block Groups (CBG) included in a first transport block in the first PDSCH or in a second transport block in the second PDSCH; and
a transmitter configured to transmit a first Hybrid Automatic Repeat Request Acknowledgement (HARQ-ACK) for the first transport block in the first PDSCH and a second HARQ-ACK for the second transport block in the second PDSCH, wherein:
the first DCI format includes information indicating which code block groups are transmitted, each of the code block groups including one or more code blocks,
the first HARQ-ACK includes HARQ-ACK for each CBG included in the first transport block,
the second DCI format does not include information indicating which CBGs are transmitted,
in a case where the second transport block in the second PDSCH is a retransmission of the first transport block in the first PDSCH, the second HARQ-ACK includes HARQ-ACK for each CBG included in the second transport block, and
in a case where the second transport block in the second PDSCH is not a retransmission of the first transport block in the first PDSCH, the second HARQ-ACK includes HARQ-ACK for the second transport block.

2. A base station device comprising:
a transmitter configured to:
transmit a first Physical Downlink Shared Channel (PDSCH) scheduled by a first Downlink Control Information (DCI) format transmitted in a first Physical Downlink Control Channel (PDCCH) in a UE specific search space,
transmit a second PDSCH scheduled by a second DCI format transmitted in a second PDCCH in a common search space, and
transmit a first configuration including at least the maximum number of Code Block Groups (CBG) included in a first transport block in the first PDSCH or in a second transport block in the second PDSCH; and
a receiver configured to receive a first Hybrid Automatic Repeat Request Acknowledgement (HARQ-ACK) for the first transport block in the first PDSCH and a second HARQ-ACK for the second transport block in the second PDSCH, wherein:
the first DCI format includes information indicating which code block groups are transmitted, each of the code block groups including one or more code blocks,
the first HARQ-ACK includes HARQ-ACK for each CBG included in the first transport block,
the second DCI format does not include information indicating which CBGs are transmitted,
in a case where the second transport block in the second PDSCH is a retransmission of the first transport block in the first PDSCH, the second HARQ-ACK includes HARQ-ACK for each CBG included in the second transport block, and
in a case where the second transport block in the second PDSCH is not a retransmission of the first transport block in the first PDSCH, the second HARQ-ACK includes HARQ-ACK for the second transport block.

3. A communication method used for a terminal device, the communication method comprising:
- receiving a first Physical Downlink Shared Channel (PDSCH) scheduled by a first Downlink Control Information (DCI) format transmitted in a first Physical Downlink Control Channel (PDCCH) in a UE specific search space;
- receiving a second PDSCH scheduled by a second DCI format transmitted in a second PDCCH in a common search space;
- receiving a first configuration including at least the maximum number of Code Block Groups (CBG) included in a first transport block in the first PDSCH or in a second transport block in the second PDSCH; and
- transmitting a first Hybrid Automatic Repeat Request Acknowledgement (HARQ-ACK) for the first transport block in the first PDSCH and a second HARQ-ACK for the second transport block in the second PDSCH, wherein:
- the first DCI format includes information indicating which code block groups are transmitted, each of the code block groups including one or more code blocks,
- the first HARQ-ACK includes HARQ-ACK for each CBG included in the first transport block,
- the second DCI format does not include information indicating which CBGs are transmitted,
- in a case where the second transport block in the second PDSCH is a retransmission of the first transport block in the first PDSCH, the second HARQ-ACK includes HARQ-ACK for each CBG included in the second transport block, and
- in a case where the second transport block in the second PDSCH is not a retransmission of the first transport block in the first PDSCH, the second HARQ-ACK includes HARQ-ACK for the second transport block.

4. A communication method used for a base station device, the communication method comprising:
- transmitting a first Physical Downlink Shared Channel (PDSCH) scheduled by a first Downlink Control Information (DCI) format transmitted in a first Physical Downlink Control Channel (PDCCH) in a UE specific search space,
- transmitting a second PDSCH scheduled by a second DCI format transmitted in a second PDCCH in a common search space;
- transmitting a first configuration including at least the maximum number of Code Block Groups (CBG) included in a first transport block in the first PDSCH or in a second transport block in the second PDSCH; and
- receiving a first Hybrid Automatic Repeat Request Acknowledgement (HARQ-ACK) for the first transport block in the first PDSCH and a second HARQ-ACK for the second transport block in the second PDSCH, wherein:
- the first DCI format includes information indicating which code block groups are transmitted, each of the code block groups including one or more code blocks,
- the first HARQ-ACK includes HARQ-ACK for each CBG included in the first transport block,
- the second DCI format does not include information indicating which CBGs are transmitted,
- in a case where the second transport block in the second PDSCH is a retransmission of the first transport block in the first PDSCH, the second HARQ-ACK includes HARQ-ACK for each CBG included in the second transport block, and
- in a case where the second transport block in the second PDSCH is not a retransmission of the first transport block in the first PDSCH, the second HARQ-ACK includes HARQ-ACK for the second transport block.

\* \* \* \* \*